United States Patent
Meng et al.

(10) Patent No.: US 11,402,267 B2
(45) Date of Patent: Aug. 2, 2022

(54) LIGHT SPLITTING DEVICE AND METHOD FOR MANUFACTURING THE SAME, METHOD FOR DISPERSING LIGHT, AND SPECTROMETER

(71) Applicant: BOE TECHNOLOGY GROUP CO., LTD., Beijing (CN)

(72) Inventors: Xianqin Meng, Beijing (CN); Wei Wang, Beijing (CN); Xiaochuan Chen, Beijing (CN); Xiandong Meng, Beijing (CN); Jifeng Tan, Beijing (CN); Jian Gao, Beijing (CN); Fangzhou Wang, Beijing (CN); Qiuyu Ling, Beijing (CN); Peilin Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 175 days.

(21) Appl. No.: 16/768,543

(22) PCT Filed: Nov. 1, 2019

(86) PCT No.: PCT/CN2019/114987
§ 371 (c)(1),
(2) Date: May 29, 2020

(87) PCT Pub. No.: WO2020/088642
PCT Pub. Date: May 7, 2020

(65) Prior Publication Data
US 2020/0340861 A1   Oct. 29, 2020

(30) Foreign Application Priority Data

Nov. 2, 2018  (CN) .......................... 201811303157.6

(51) Int. Cl.
*G01J 3/28* (2006.01)
*G01J 3/02* (2006.01)
(Continued)

(52) U.S. Cl.
CPC ............... *G01J 3/28* (2013.01); *G01J 3/0218* (2013.01); *G01J 3/14* (2013.01); *G01J 3/18* (2013.01);
(Continued)

(58) Field of Classification Search
CPC .... G01J 3/28; G01J 3/0218; G01J 3/14; G01J 3/18; G01J 2003/1208; G01J 3/20;
(Continued)

(56) References Cited

U.S. PATENT DOCUMENTS 2,960,907 A * 11/1960 Leitz ...................... G03B 13/20
356/18
5,553,052 A * 9/1996 Oono .................... G11B 7/0956
359/813
(Continued)

FOREIGN PATENT DOCUMENTS

CN   102089689 A   6/2011
CN   103134587 A   6/2013
(Continued)

OTHER PUBLICATIONS

First Office Action for related CN App No. 201811303157.6 dated Mar. 1, 2020, 18 pgs.
(Continued)

*Primary Examiner* — Mohamed K Amara
(74) *Attorney, Agent, or Firm* — Procopio, Cory, Hargreaves & Savitch LLP

(57) ABSTRACT

A light splitting device includes an optical waveguide body and a dispersion grating. The optical waveguide body is configured to transmit incident light to the dispersion grating, the dispersion grating is configured to disperse the incident light transmitted by the optical waveguide body into a plurality of spectral lines, and the optical waveguide body is further configured to change propagation directions of the
(Continued)

plurality of spectral lines and to emit the plurality of spectral lines.

18 Claims, 9 Drawing Sheets

(51) Int. Cl.
    *G01J 3/14*     (2006.01)
    *G01J 3/18*     (2006.01)
    *G02B 6/12*     (2006.01)
    *G02B 6/13*     (2006.01)
    *G01J 3/12*     (2006.01)

(52) U.S. Cl.
    CPC ...... *G02B 6/12011* (2013.01); *G02B 6/12014* (2013.01); *G02B 6/13* (2013.01); *G01J 2003/1208* (2013.01); *G02B 2006/12107* (2013.01); *G02B 2006/12114* (2013.01); *G02B 2006/12173* (2013.01)

(58) Field of Classification Search
    CPC .............. G01J 3/1895; G02B 6/12011; G02B 6/12014; G02B 6/13; G02B 2006/12107; G02B 2006/12114; G02B 2006/12173; G02B 6/124; G02B 6/4215; G02B 6/12019; G02B 6/4214; G02B 27/4233; G02B 27/44
    See application file for complete search history.

(56) References Cited

U.S. PATENT DOCUMENTS

| | | | | |
|---|---|---|---|---|
| 5,937,113 A * | 8/1999 | He | ........................ | G02B 6/125 385/11 |
| 6,339,664 B1 * | 1/2002 | Farjady | .............. | G02B 6/12011 385/24 |
| 6,654,533 B1 * | 11/2003 | Koteles | ................. | G02B 6/124 385/131 |
| 6,657,723 B2 * | 12/2003 | Cohen | ................ | G02B 6/12007 356/328 |
| 7,208,682 B2 * | 4/2007 | Kuchta | .................. | H01B 3/446 174/11 OR |
| 7,615,339 B2 * | 11/2009 | Cunningham | ... | G01N 33/54373 435/4 |
| 8,389,299 B2 * | 3/2013 | Shaw | ................... | G01N 33/553 436/805 |
| 8,395,768 B2 | 3/2013 | Li et al. | | |
| 8,827,973 B2 * | 9/2014 | Stokes | ....................... | G01L 1/24 604/319 |
| 9,254,485 B2 * | 2/2016 | Chang | ................ | B01L 3/502715 |
| 10,119,915 B2 * | 11/2018 | Tu | ..................... | G01N 21/6452 |
| 10,128,635 B2 * | 11/2018 | Ring | ................... | H01S 5/34306 |
| 10,592,722 B2 * | 3/2020 | Xu | ....................... | H01L 51/5203 |
| 10,757,398 B1 * | 8/2020 | Magoz | ................. | H04N 13/341 |
| 2002/0159700 A1 * | 10/2002 | Coroy | ................ | G02B 6/1203 385/39 |
| 2002/0181832 A1 * | 12/2002 | Feng | ................. | G02B 6/12033 385/15 |
| 2002/0181869 A1 * | 12/2002 | Lin | .................. | H04B 10/25133 385/37 |
| 2003/0026520 A1 * | 2/2003 | Lin | ..................... | G02B 6/12028 385/15 |
| 2003/0048498 A1 * | 3/2003 | Pearson | ........... | H04B 10/07955 398/5 |
| 2003/0175005 A1 * | 9/2003 | Bauer | .................. | G02B 6/1203 385/145 |
| 2003/0228104 A1 * | 12/2003 | Tabuchi | ................. | G02B 6/105 385/37 |
| 2004/0046963 A1 * | 3/2004 | Lackritz | ............... | G01N 21/553 356/445 |
| 2005/0141808 A1 * | 6/2005 | Cheben | ................ | G02B 6/4214 385/31 |
| 2005/0163187 A1 * | 7/2005 | Spinelli | .................. | H01S 3/083 372/94 |
| 2006/0177180 A1 * | 8/2006 | Tazawa | .............. | G02B 6/12016 385/37 |
| 2007/0065076 A1 * | 3/2007 | Grek | .................. | G02B 6/12026 385/37 |
| 2007/0086703 A1 * | 4/2007 | Kirk | ..................... | G02B 6/2938 385/37 |
| 2008/0031570 A1 * | 2/2008 | Fondeur | ................ | G02B 6/356 385/18 |
| 2008/0193134 A1 * | 8/2008 | Ranalli | ................. | H04J 14/021 398/85 |
| 2011/0123152 A1 | 5/2011 | Bicknell et al. | | |
| 2011/0262072 A1 * | 10/2011 | Lewis | ..................... | G02B 6/32 385/26 |
| 2013/0315526 A1 * | 11/2013 | Krishnamoorthy | ...... | G02B 6/43 385/14 |
| 2016/0156415 A1 * | 6/2016 | Selim | .................... | H01S 5/0612 398/43 |
| 2017/0031144 A1 * | 2/2017 | Rostykus | .......... | G02B 27/4205 |
| 2017/0052384 A1 | 2/2017 | Santori et al. | | |
| 2018/0011334 A1 | 1/2018 | Zeitner et al. | | |
| 2018/0164518 A1 * | 6/2018 | Hu | ........................ | G02B 6/34 |
| 2018/0173000 A1 * | 6/2018 | Rothberg | .......... | G02B 27/0927 |
| 2020/0108387 A1 | 4/2020 | Dong et al. | | |
| 2020/0340861 A1 | 10/2020 | Meng et al. | | |
| 2020/0363321 A1 * | 11/2020 | Wang | .................... | G01J 3/0218 |
| 2021/0085814 A1 * | 3/2021 | Ashrafi | ..................... | A61L 2/24 |

FOREIGN PATENT DOCUMENTS

| | | | | |
|---|---|---|---|---|
| CN | 104515597 A | 4/2015 | | |
| CN | 104515597 B | 4/2015 | | |
| CN | 104570200 A | 4/2015 | | |
| CN | 204740204 U | 11/2015 | | |
| CN | 106471415 A | 3/2017 | | |
| CN | 107607475 A | 1/2018 | | |
| CN | 109239940 A | 1/2019 | | |
| CN | 108923880 B * | 6/2019 | ............... | G01J 1/42 |
| DE | 102016112504 A1 | 1/2018 | | |
| WO | WO-2005010169 A2 * | 2/2005 | ............. | A61P 11/00 |
| WO | WO-2016175859 A1 * | 11/2016 | ............ | G01J 3/0259 |

OTHER PUBLICATIONS

Second Office Action for related CN App No. 201811303157.6 dated Oct. 10, 2020, 7 pgs.

* cited by examiner

```
┌─────────────────────────────────────────────────────────┐
│ An optical mask is provided above the waveguide layer,  │
│ the optical mask has patterns that are in one-to-one    │──── S221
│ correspondence to the Dove prism, the input waveguide,  │
│ the arrayed waveguide and the array of output waveguides│
└─────────────────────────────────────────────────────────┘
                            ↓
┌─────────────────────────────────────────────────────────┐
│ By using the optical mask, the waveguide layer is       │
│ processed to obtain the Dove prism, and the input       │
│ waveguide, the arrayed waveguide and the array of       │──── S222
│ output waveguides all disposed in the top surface of    │
│ the Dove prism                                          │
└─────────────────────────────────────────────────────────┘
                            ↓
┌─────────────────────────────────────────────────────────┐
│              The optical mask is removed                │──── S223
└─────────────────────────────────────────────────────────┘
```

FIG. 15

```
┌─────────────────────────────────────────────────────────┐
│ A metal film is formed on a surface of the waveguide    │──── S2211
│ layer facing away from the first light-transparent layer│
└─────────────────────────────────────────────────────────┘
                            ↓
┌─────────────────────────────────────────────────────────┐
│ A photoresist layer is formed on a surface of the metal │──── S2212
│ film facing away from the waveguide layer               │
└─────────────────────────────────────────────────────────┘
                            ↓
┌─────────────────────────────────────────────────────────┐
│ The photoresist layer is processed by imprinting to     │
│ obtain a photoresist mask, and the photoresist mask has │──── S2213
│ patterns that are in one-to-one correspondence to the   │
│ Dove prism, the input waveguide, the arrayed waveguide  │
│ and the array of output waveguides                      │
└─────────────────────────────────────────────────────────┘
                            ↓
┌─────────────────────────────────────────────────────────┐
│ By using the photoresist mask, the metal film is        │
│ processed to obtain a metal mask, the metal mask has    │
│ patterns that are in one-to-one correspondence to the   │──── S2214
│ Dove prism, the input waveguide, the arrayed waveguide  │
│ and the array of output waveguides, and the metal mask  │
│ and the photoresist mask form the optical mask          │
└─────────────────────────────────────────────────────────┘
```

FIG. 16

LIGHT SPLITTING DEVICE AND METHOD FOR MANUFACTURING THE SAME, METHOD FOR DISPERSING LIGHT, AND SPECTROMETER

CROSS-REFERENCE TO RELATED APPLICATIONS

This application is a national phase entry under 35 USC 371 of International Patent Application No. PCT/CN2019/114987 filed on Nov. 1, 2019, which claims priority to Chinese Patent Application No. 201811303157.6 filed with the Chinese Patent Office on Nov. 2, 2018, titled "LIGHT SPLITTING DEVICE AND METHOD FOR MANUFACTURING THE SAME, METHOD FOR DISPERSING LIGHT, AND SPECTROMETER", which are incorporated herein by reference in their entirety.

TECHNICAL FIELD

The present disclosure relates to the technical field of light detection, and in particular to a light splitting device and a method for manufacturing the same, method method for dispersing light, and a spectrometer.

BACKGROUND

Spectrometer is a light detection apparatus that measures the intensity of spectral lines at different wavelengths by light detectors. As a key component of the spectrometer, a light splitting system can split light to be measured, so as to divide the light to be measured into a plurality of spectral lines that can be detected by the light detectors.

SUMMARY

In one aspect, a light splitting device is provided. The light splitting device includes an optical waveguide body and a dispersion grating. The optical waveguide body configured to transmit incident light to the dispersion grating, the dispersion grating configured to disperse the incident light transmitted by the optical waveguide body into a plurality of spectral lines, and the optical waveguide body is further configured to change propagation directions of the plurality of spectral lines and to emit the plurality of spectral lines.

In some embodiments, the light splitting device further includes a first light-transparent layer and a second light-transparent layer that are opposite to each other. Both the optical waveguide body and the dispersion grating are disposed between the first light-transparent layer and the second light-transparent layer. A refractive index of a material for the optical waveguide body and a refractive index of a material for the dispersion grating are both greater than a refractive index of a material for the first light-transparent layer and are both greater than a refractive index of a material for the second light-transparent layer.

In some embodiments, the optical waveguide body includes an input waveguide and an array of output waveguides. The input waveguide is configured to supply the received incident light to the dispersion grating, and the array of output waveguides is configured to guide the plurality of spectral lines and to emit the plurality of spectral lines.

In some embodiments, the input waveguide is a second bent waveguide.

In some embodiments, the array of output waveguides includes a plurality of guiding waveguides in one-to-one correspondence to the plurality of spectral lines, and there is a first space between any two adjacent guiding waveguides of the plurality of guiding waveguides.

In some embodiments, the optical waveguide body further includes a Dove prism. The Dove prism includes: a bottom surface and a top surface that are opposite to each other, and an incident slope and an exit slope that are opposite to each other. The bottom surface faces the first light-transparent layer and the top surface faces the second light-transparent layer, and the input waveguide, the array, of output waveguides and the dispersion grating are all disposed in the top surface. The incident slope is configured to reflect the incident light irradiated into the Dove prism, and to supply the reflected incident light to the input waveguide. The exit slope is configured to reflect the plurality of spectral lines emitted from the array of output waveguides and to derive the plurality of spectral lines from the Dove prism. There is an angle ψ between The incident slope and the bottom surface form an angle ψ, a sum of the angle ψ and an incident angle α of the incident ray onto the incident slope is 90° (ψ+α=90°), ψ is greater than zero and less than or equal to 56.25° (0<ψ≤56.25°), and an incident angle θ of the incident ray onto the bottom surface is equal to $$\arcsin\left(\frac{n_{Layer}}{n_{air}} \times \sin\alpha\right)\left(\theta = \arcsin\left(\frac{n_{Layer}}{n_{air}} \times \sin\alpha\right)\right),$$

where $n_{Layer}$ denotes the refractive index of the material for the first light-transparent layer, $n_{air}$ denotes a refractive index of air, and a refractive index of a material for the Dove prism is within a range from 1.8 to 1.9, inclusive.

In some embodiments, the dispersion grating includes an arrayed waveguide. The arrayed waveguide includes a plurality of first bent waveguides, there is a second space between any two adjacent first bent waveguides of the plurality of first bent waveguides, and there is an optical path difference between any two adjacent first bent waveguides. The input waveguide is disposed at a light entry side of the arrayed waveguide, and the array of output waveguides is disposed at a light exit side of the arrayed waveguide.

In some embodiments, the dispersion grating includes a concave grating, and a Rowland circle of the concave grating has a plurality of light focusing points. The concave grating is configured to diffract the received incident light into a plurality of spectral lines and to make each of the plurality of spectral lines be focused on a corresponding light focusing point. Both the input waveguide and the array of output waveguides are disposed at a concave surface of the concave grating. The array of output waveguides includes a plurality of guiding waveguides in one-to-one correspondence to the plurality of spectral lines, and the plurality of guiding waveguides are further in one-to-one correspondence to the plurality of light focusing points.

In some embodiments, the concave grating is at least partially disposed inside the Dove prism.

In some embodiments, the optical waveguide body further includes a reflecting structure and a plurality of diffraction gratings, the dispersion grating includes a concave grating, both the input waveguide and the array of output waveguides are disposed at a concave surface of the concave grating, and the array of output waveguides includes a plurality of guiding waveguides. The plurality of guiding waveguides are in one-to-one correspondence to a plurality of light focusing points on a Rowland circle of the concave grating. The reflecting structure is configured to reflect the received incident light and to supply the reflected incident light to the input waveguide. The input waveguide is configured to supply the received incident light to the concave grating. The concave grating, is configured to diffract the received incident light into a plurality of spectral lines and to make each of the plurality of spectral lines be focused on a corresponding light focusing point. Each of the plurality of guiding waveguides is configured to transmit a corresponding spectral line to a corresponding diffraction grating, Each of the plurality of diffraction gratings is configured to control a corresponding spectral line to emit from the first light-transparent, layer.

In another aspect, a method for manufacturing a light splitting device is provided, The method for manufacturing a light splitting device includes: forming an optical waveguide body and forming a dispersion grating, The optical waveguide body is configured to transmit incident light to the dispersion grating, the dispersion grating is configured to disperse the incident light transmitted by the optical waveguide body into a plurality of spectral lines, and the optical waveguide body is further configured to change propagation directions of the plurality of spectral lines and to emit the plurality of spectral lines.

In some embodiments, the method further includes: forming a first light-transparent layer. A refractive index of a material for the first light-transparent layer is less than both a refractive index of a material for the optical waveguide body and a refractive index of a material for the dispersion grating, Before forming the optical waveguide body and forming the dispersion grating, the method further includes: forming a second light-transparent layer. The second light-transparent layer is opposite to the first light-transparent layer. Both the optical waveguide body and the dispersion grating are disposed between the first light-transparent layer and the second light-transparent layer. A refractive index of a material for the second light-transparent layer is less than both the refractive index of the material for the optical waveguide body and the refractive index of the material for the dispersion grating.

In some embodiments, the optical waveguide body includes a Dove prism, and the dispersion grating includes an arrayed waveguide. Forming an optical waveguide body and forming a dispersion grating, includes: forming a waveguide layer on a surface of the first light-transparent layer, a refractive index of a material for the waveguide layer being greater than the refractive index of the material for the first light-transparent layer; and forming, by using the waveguide layer, a Dove prism, and an input waveguide an arrayed waveguide and an array of output waveguides all disposed in a top surface of the Dove prism. The Dove prism includes an incident slope and an exit slope. The incident slope is configured to reflect the incident light irradiated into the Dove prism and to supply the reflected incident light to the input waveguide. The input waveguide is configured to supply the received incident light to the arrayed waveguide. The array of output waveguides is configured to guide the plurality of spectral lines and to supply the plurality of spectral lines to the exit slope. The exit slope is configured to reflect the plurality of spectral lines and to derive the plurality of spectral lines from the Dove prism.

In some embodiments, forming, by using the waveguide layer, a Dove prism, and an input waveguide, an arrayed waveguide and an array of output waveguides all disposed in a top surface of the Dove prism, includes: providing an optical mask above the waveguide layer, the optical mask including a plurality of patterns that are in one-to-one correspondence to the Dove prism to be formed, the input waveguide to be formed, the arrayed waveguide to be formed and the array of output waveguides to be formed; processing, by using the optical mask, the waveguide layer to obtain the Dove prism and the input waveguide, the arrayed waveguide and the array of output waveguides all disposed in the top surface of the Dove prism, there being an angle ψ between the incident slope and a bottom surface of the Dove prism, a sum of the angle ψ and an incident angle α of the incident light onto the incident slope of the Dove prism being 90° (ψ+α=90°), and an incident angle θ of the incident light onto the bottom surface of the Dove prism being equal to $$\arcsin\left(\frac{n_{Layer}}{n_{air}} \times \sin\alpha\right)\left(\theta = \arcsin\left(\frac{n_{Layer}}{n_{air}} \times \sin\alpha\right)\right),$$

where $n_{Layer}$ denoting the refractive index of the material for the first light-transparent layer, and $n_{air}$ denoting a refractive index of air; and removing the optical mask.

In some embodiments, providing an optical mask above the waveguide layer, includes: forming a metal film on a surface of the waveguide layer facing away from the first light-transparent layer; forming a photoresist layer on a surface of the metal film facing away from the waveguide layer; processing the photoresist layer by imprinting to obtain a photoresist mask, the photoresist mask including a plurality of patterns that are, one-to-one correspondence to the Dove prism to be formed, the input waveguide to be formed, the arrayed waveguide to be formed and the array of output waveguides to be, formed; and processing, by using the photoresist mask, the metal film to obtain a metal, mask, the metal mask including a plurality of patterns that are in one-to-one correspondence to the Dove prism to be formed, the input waveguide to be formed, the arrayed waveguide to be formed and the array of output waveguides to be formed, and the metal mask and the photoresist mask forming the optical mask. Removing the optical mask, includes: removing the photoresist mask, and removing the metal mask.

In still another aspect, a method for dispersing light is provided. The method for dispersing light is used in the light splitting device provided in above some embodiments. The method for dispersing light includes: by the optical waveguide body, receiving incident light and transmitting the incident light to the dispersion grating; dispersing, by the dispersion grating, the received incident light into a plurality of spectral lines; and by the optical waveguide body, changing the propagation directions of the plurality of spectral lines and emitting the plurality of spectral lines.

In yet another aspect, a spectrometer is provided. The spectrometer includes the light splitting device provided in above some embodiments.

In some embodiments, the light splitting device includes a first light-transparent layer and a second light-transparent layer that are opposite to each other. The spectrometer further includes: a collimated light source, a micro-fluidic substrate and a sensing substrate. The collimated light source is disposed at a side of the first light-transparent layer facing away from the second light-transparent layer and configured to supply incident light to the optical waveguide body. The micro-fluidic substrate is disposed at a side of the first light-transparent layer facing away from the second light-transparent layer and corresponds to exit positions for the plurality of spectral lines. The sensing substrate is disposed at a side of the micro-fluidic substrate facing away from, the first light-transparent layer and is configured to detect the plurality of spectral lines passing through the micro-fluidic substrate.

In some embodiments, the micro-fluidic substrate includes: a first base substrate, and a reaction tank, a waste reservoir and a plurality of micro-fluidic channels all disposed on a side of the first base substrate facing the first light-transparent layer, and a contact adjustment layer disposed on an inner wall of each of the plurality of micro-fluidic channels. The plurality of micro-fluidic channels are communicated with the reaction tank and the waste reservoir, respectively. The plurality of micro-fluidic channels are in one-to-one correspondence with the plurality of spectral lines. The sensing substrate includes: a second base substrate, and a plurality of photosensitive detectors disposed on a side of the second base substrate facing the first base substrate. An orthographic projection of each of the plurality of photosensitive detectors on the second base substrate is within an orthographic projection of one of the plurality of micro-fluidic channels on the second base substrate.

In some embodiments, the contact adjustment layer a hydrophilic film or a hydrophobic film.

BRIEF DESCRIPTION OF THE DRAWINGS

The accompanying drawings illustrated herein, which constitute part of the present disclosure, are used to provide further understanding of the present disclosure, and some exemplary embodiments of the present disclosure and the description thereof are used to explain the present disclosure and not intended to inappropriately limit the present disclosure. In the drawings:

FIG. 15 is a flow diagram showing a method for manufacturing still another light splitting device, according to some embodiments of the present disclosure;

FIG. 16 is a flow diagram showing a method for manufacturing yet another light splitting device, according to some embodiments of the present disclosure.

DETAILED DESCRIPTION

The technical solutions in some embodiments of the present disclosure will be described clearly and completely with reference to the accompanying drawings in some embodiments of the present disclosure, Obviously, the embodiments to be described are merely some embodiments of the present disclosure rather than all embodiments of the present disclosure.

In the related art, light splitting systems in spectrometers are usually divided into dispersive light splitting systems and modulated light splitting systems. A dispersive light splitting system usually splits light by using prism(s), grating(s), or interferometer(s), etc. At present, the dispersive light splitting system usually splits light to be measured by using a combination of gratings of different types or a combination of grating(s) and prism(s), so as to improve the light splitting efficiency of the light splitting system. However, this leads to complex structure, high manufacturing difficulty and high cost of the light splitting system. Furthermore, in a case where the spectrometer is applied to the detection of micro-fluids, a micro-nano-structure is required to derive the plurality of spectral lines, which are formed by the dispersion of the light splitting system, out of the light splitting system; and the light efficiency of the derived spectral lines is low.

Figure 10:
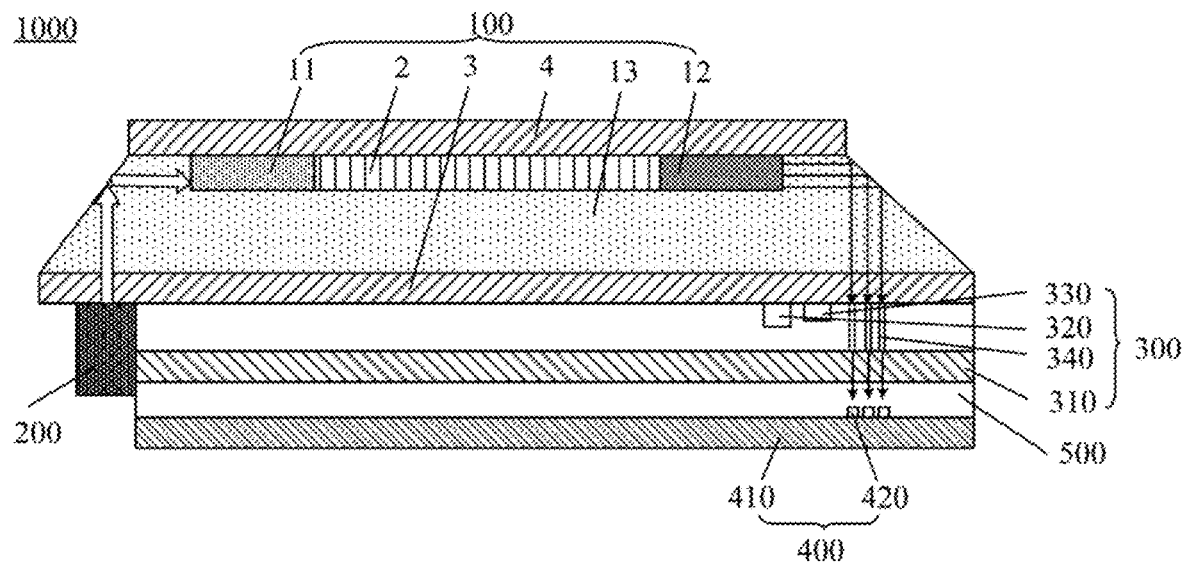
FIG. 10 is a schematic diagram showing a structure of a spectrometer, according to some embodiments of the present disclosure.
Figure 11:
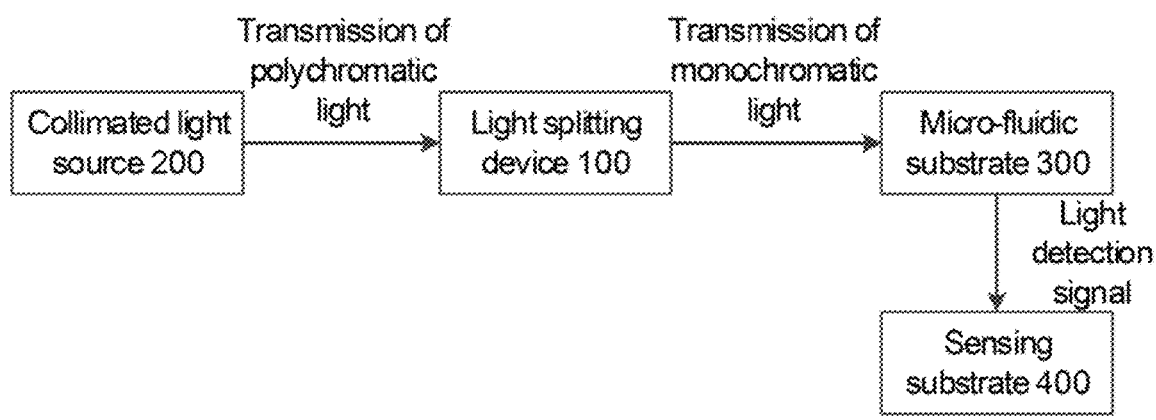
FIG. 11 is a block diagram showing a working principle of a spectrometer, according to some embodiments of the present disclosure.

Referring to FIGS. 10 and 11, some embodiments of the present disclosure provide a spectrometer 1000. The spectrometer 1000 includes a light splitting device 100 and a collimated light source 200. The collimated light source 200 is configured to supply incident light (for example, polychromatic light) to the light splitting device 100. The light splitting device 100 is configured to disperse the incident light supplied by the collimated light source 200 into monochromatic light at different wavelengths (for example, a plurality of spectral lines), and to change propagation directions of the plurality of spectral lines to derive the plurality of spectral lines.

In a case where the spectrometer 1000 is applied to the detection of micro-fluids, the plurality of spectral lines derived from the light splitting device 100 can be transmitted to micro-fluids in preset directions. In this way, the micro-fluids can have certain physical changes or chemical changes when irradiated by the plurality of spectral lines, so that the plurality of spectral lines can carry information about the detected micro-fluids after passing through the micro-fluids. Thus, the detection of micro-fluids can be realized. Here, a spectral line that has, carried information about the detected micro-fluid is called a light detection signal.

The structure of the spectrometer 1000 provided in some embodiments of the present disclosure will be described schematically with reference to the accompanying drawings.

As shown in FIGS. 1 to 9, some embodiments of the present disclosure provide a light splitting device 100, The light splitting device 100 includes an optical waveguide body 1 and a dispersion grating 2. The optical waveguide body 1 is configured to transmit incident light to the dispersion grating 2, the dispersion grating 2 is configured to disperse the incident light transmitted by the optical waveguide body 1 into a plurality of spectral lines, and the optical waveguide body 1 is further configured to change propagation directions of the plurality of spectral lines and to emit the plurality of spectral lines.

Here, the relative position relationship between the dispersion grating 2 and the optical waveguide body 1 is set according to a direction of the light path.

In the case where the light splitting device 100 is applied to the detection of micro-fluids, the incident light is transmitted to the dispersion grating 2 by the optical waveguide body 1 and then dispersed into a plurality of spectral lines by the dispersion grating 2. The plurality of spectral lines, propagation directions of which are changed by the optical waveguide body 1, can be directly emitted to the micro-fluids. In this way, the micro-fluids has have certain physical changes or chemical changes when irradiated by the plurality of spectral lines, so that the plurality of spectral lines can carry information about the detected micro-fluids after passing through the micro-fluids. Thus, the detection of micro-fluids can be realized. Here, the incident light is usually polychromatic light, for example, white light.

Thus, in the light splitting device 100 provided in these embodiments of the present disclosure, with the arrangement of the optical waveguide body 1 and the dispersion grating 2, the incident light transmitted by the optical waveguide body 1 can be dispersed into a plurality of spectral lines by the dispersion grating 2, and the plurality of spectral lines can be derived by the optical waveguide body 1. In this way, the structure of the light splitting device 100 can be simplified effectively. Furthermore, in the case where the light splitting device 100 is applied to the detection of micro-fluids, the plurality of spectral lines can be transmitted to the micro-fluids to realize the detection of the micro-fluids simply by placing the micro-fluids at corresponding positions where the optical waveguide body 1 emits the plurality of spectral lines, without, requiring any micro-nano-structure to derive the plurality of spectral lines. This simplifies the flow of the detection of micro-fluids. In addition, by deriving the plurality of spectral lines by the optical waveguide body 1, the light efficiency of the derived plurality of spectral lines can be approximately to the light efficiency of the plurality of, spectral lines formed by dispersion. The loss in the light efficiency of the derived plurality of spectral lines can be reduced effectively.

Figure 1:
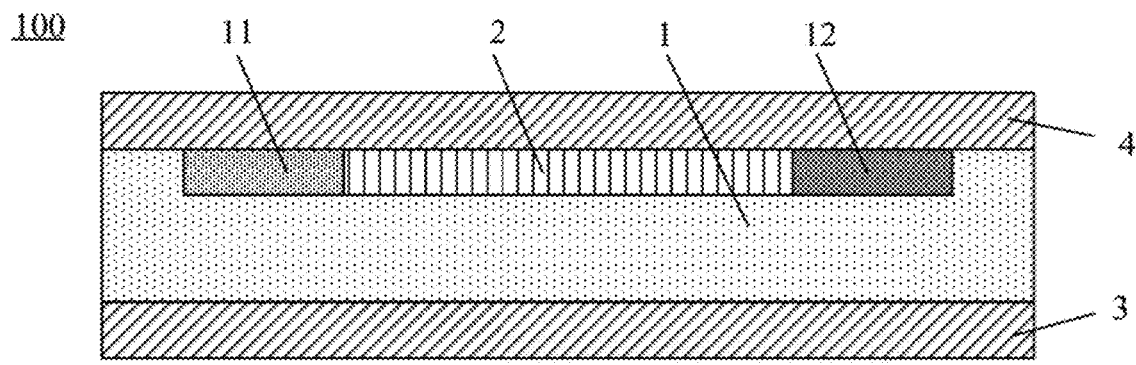
FIG. 1 is a schematic diagram showing a structure of a light splitting device, according to some embodiments of the present disclosure.

In some embodiments, as shown in FIG. 1, the light splitting device 100 further includes a first light-transparent layer 3 and a second light-transparent layer 4 that are opposite to each other. The optical waveguide body 1 is disposed between the first light-transparent layer 3 and the second light-transparent layer 4, and the dispersion grating 2 is disposed between the second light-transparent layer 4 and the optical vvaveguide body 1. Furthermore, a refractive index of a material for the optical waveguide body 1 and a refractive index of a material for the dispersion grating 2 are both greater than a refractive index, of a material for the first light-transparent layer 3 and both greater than a refractive index of a material for the second light-transparent layer 4. In this way, a surface of the first light-transparent layer 3 proximate to the second light-transparent layer 4 and a surface of the second light-transparent layer 4 proximate to the first light-transparent layer 3 can become fully reflecting interfaces. If an incident angle of the incident light onto the first light-transparent layer 3 or second light-transparent layer 4 by the optical waveguide body 1 is greater than a critical angle, the incident light will be fully reflected between the first light-transparent layer 3 and the second light-transparent layer 4. Here, the critical angle is an incident angle having a refraction angle of 90°.

In some embodiments of the present disclosure, the dispersion grating 2 and the optical waveguide body 1 are disposed between the first light-transparent layer 3 and the second light-transparent layer 4. This can effectively reduce or avoid the leakage of the incident light during its transmiss on, and also reduce or avoid the leakage of the plurality of spectral lines during their transmission.

In some examples, the structure f the first light-transparent layer 3 is diverse. For example, the first light-transparent layer 3 is a glass substrate that is the same as the glass substrate used in liquid crystal displays or organic light emitting displays, or, is a thin film that is made from a material such as optical glass with low refractive index or transparent resin. However, the structure of the first light-transparent layer 3 is not limited thereto.

Here, the thickness of the first light-transparent layer 3 may be selected according to actual requirements and will not be limited in some embodiments of the present disclosure. In some examples, the light splitting device 100 is applied to the detection of micro-fluids. Considering that the plurality of spectral lines are incident to the micro-fluids through the first light-transparent layer 3 by the effect of the optical waveguide body 1, a thickness of the first light-transparent layer 3 is small, so as to reduce the probability of color mixing during the passing of the plurality of spectral lines through the light-transparent layer 3. For example, the first light-transparent layer 3 is made from 3t optical glass (i.e., optical glass having a thickness about 3 mm) with a refractive index of 1.4 to 1.58 (for example, 1.52), inclusive, and the first light-transparent layer 3 has a thickness of 0.2 mm to 0.4 mm, inclusive.

In some examples, the structure of the second light-transparent layer 4 is diverse. For example, the second light-transparent layer 4 is a glass substrate that is the same as the glass substrate used in the liquid crystal displays or organic light emitting displays, or, is a thin film that is made from a material such as photoresist with low refractive index or $SiO_2$ with low refractive index. However the structure of the second first light-transparent layer 4 is not limited thereto.

Here, a thickness cif the second light-transparent layer 4 may be selected according to actual requirements and will not be limited in some embodiments of the present disclosure. In some examples, a thickness of the second light-transparent layer 4 is small, so as to reduce the impact on the propagation directions of the plurality of spectral lines by the second light-transparent layer 4. Furthermore, by the small thickness of the second light-transparent layer 4, the plurality of spectral lines can be incident to the micro-fluids accurately after their propagation directions are changed. For example, the second light-transparent layer 4 is made from phenolic resin or photoresist with a refractive index of 1.20 to 1.30 (for example, 1.25), inclusive, and the second light-transparent layer 4 has a thickness of 0.1 mm to 2 mm, inclusive.

In addition, the first light-transparent layer 3 and of the second light-transparent layer 4 should have a structure as flat as possible, and they should be s parallel as possible to each other, so as to avoid influencing the transmission of the incident light or the plurality of spectral lines due to a great included angle between the first light-transparent layer 3 and the second light-transparent layer 4.

In some embodiments, as shown in FIGS. 1, 4, and 6 to 8, the optical waveguide body 1 includes an input waveguide 11 disposed at a light entry side of the dispersion grating 2 and an array of output waveguides 12 disposed at a light exit side of the dispersion grating 2.

In some examples, the input waveguide 11 is a waveguide that is bent to an arc shape.

The input waveguide configured to supply the incident ight transmitted by the optical waveguide body 1 to the dispersion grating 2, and the array of output waveguides 12 is configured to guide the plurality of spectral lines to change the propagation directions of the plurality of spectral lines and to emit the plurality of spectral lines from the first light-transparent layer 3. Here, the light entry side of the dispersion grating 2 refers to a side of the dispersion grating 2 that receives the incident light, and the light exit side of the dispersion grating 2 refers to a side of the dispersion grating 2 that emits the plurality of spectral lines.

With the arrangement of the input waveguide 11, the incident light transmitted by the optical waveguide body 1 is supplied to the dispersion grating 2 by the input waveguide 11. The loss of the incident light during its, transmission to the dispersion grating 2 can be reduced. With the arrangement of the array of output waveguides 12, the plurality of spectral lines are guided by the array of output waveguides 12. The interference (for example, light mixing) among the plurality of spectral lines is avoided. Thus, the light loss of the plurality of spectral lines can be reduced.

In some examples, the relative position relationship among the input waveguide 11, the dispersion grating 2 and the array of output waveguides 12 is set according to the direction of the light path. In this way, the incident light can be dispersed into a plurality of spectral lines and the plurality of spectral lines can be derived from the first light-transparent layer 3, with low loss of the incident light and the plurality of spectral lines.

Figure 4:
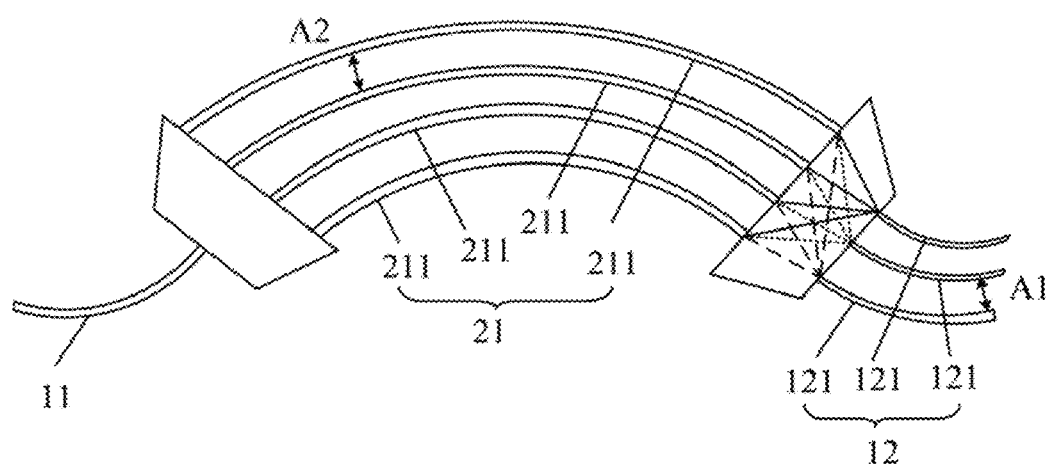
FIG. 4 is a schematic diagram showing structures of an input waveguide, an arrayed waveguide and an array of output waveguides, according to some embodiments of the present disclosure.

In some embodiments, referring to FIG. 4, the array of output waveguides 12 includes a plurality of guiding waveguides 121 in one-to-one correspondence to the plurality of spectral lines, and there is a first space A1 between any two adjacent guiding waveguides 121 of the plurality of guiding waveguides 121.

Each guiding waveguide 121 is configured to guide a corresponding one of the plurality of spectral lines, so that the corresponding one spectral line can be derived from the first light-transparent layer 3.

Each guiding waveguide 121 is disposed independently. In this way, a corresponding spectral line can be transmitted by each guiding waveguide 121 independently, to avoid a crosstalk between any two adjacent spectral lines.

Figure 6:
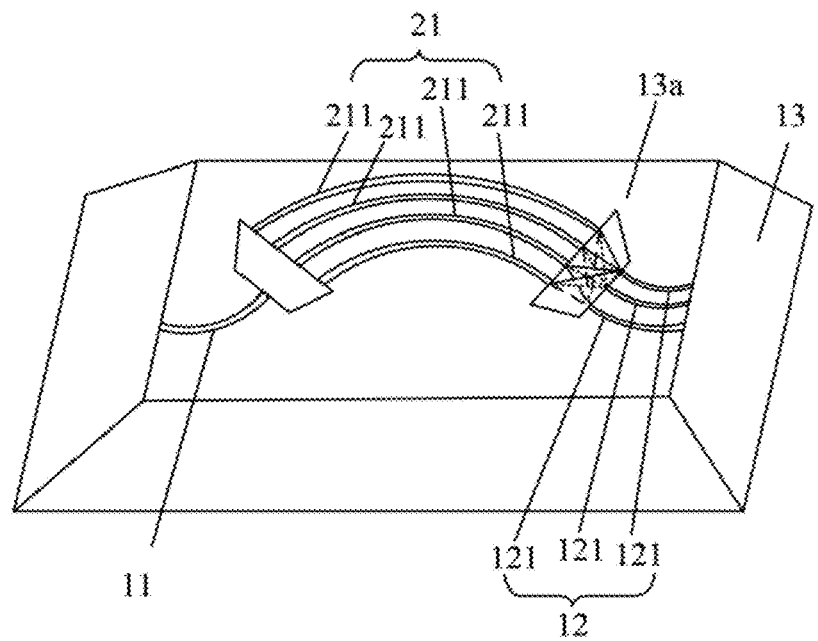
FIG. 6 is a schematic diagram showing structures of a Dove prism, an input waveguide, an arrayed waveguide and an array of output waveguides, according to some embodiments of the present disclosure.

In some embodiments of the present disclosure, a structure of the optical waveguide body 1 is diverse. For example, the optical waveguide body 1 is of an integrated structure, or the optical waveguide body 1 is of a separated structure. In some embodiments, as shown in FIGS. 2, 3 and 6, the optical waveguide body 1 is of an integral structure.

Here, the optical waveguide body 1 further includes a Dove prism 13. An appearance of the Dove prism 13 is in a form of trapezoid body. The Dove prism 13 is an image rotator. That is, when certain polychromatic light passes through the Dove prism 13, the propagation direction of the polychromatic light is changed by 180°.

Figure 2:
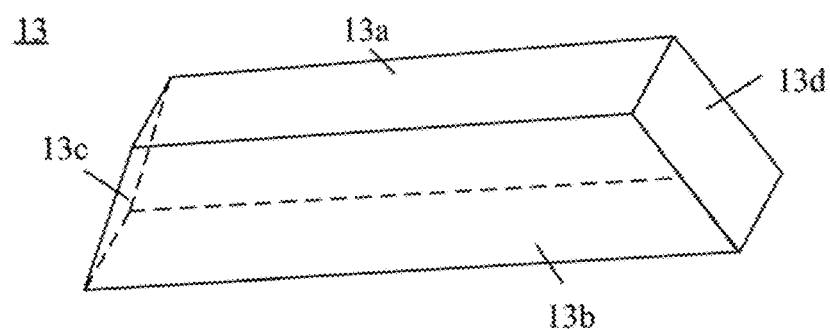
FIG. 2 is a schematic diagram showing a structure of a Dove prism, according to some embodiments of the present disclosure.
Figure 3:
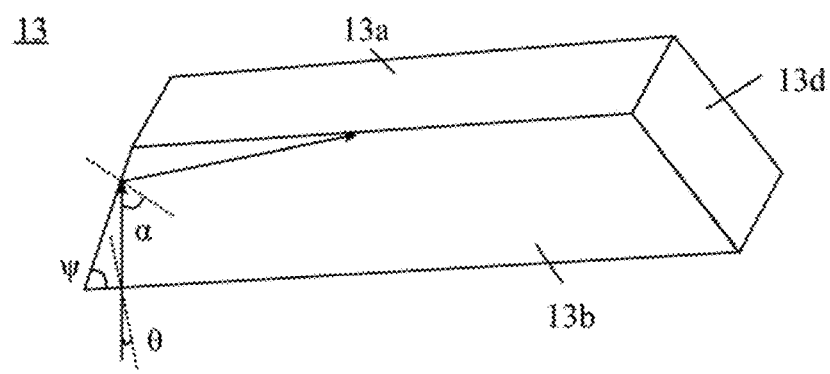
FIG. 3 is an indexing view showing structure parameters of a Dove prism, according to some embodiments of the present disclosure.

Referring to FIGS. 2 and 10, a bottom surface 13b of the Dove prism 13 is opposite to the first light-transparent layer 3, a top surface 13a of the Dove prism 13 is opposite to the second light-transparent layer 4, and the input waveguide 11, the dispersion grating 2 and the array of output waveguides 12 are all disposed in the top surface 13a of the Dove prism 13. For example, the input waveguide 11, the dispersion grating 2 and the array of output waveguides 12 are formed in the top surface 13a of the Dove prism 13 by imprinting, or etching, etc. That is, the input waveguide 11, the dispersion grating 2 and the array of output waveguides 12 are made from a same material as the Dove prism 13. The Dove prism 13 has an incident slope 13c and an exit slope 13d. The incident slope 13c is configured to reflect the incident light and to supply the incident light to the input waveguide 11.

The input waveguide 1 is configured to supply the incident light to the dispersion grating 2. The array of output waveguides 12 is configured to guide the plurality of spectral lines and to supply the plurality of spectral lines to the exit slope 13d. The exit slope 13d is configured to reflect the plurality of spectral lines and derive the plurality of spectral lines from the Dove prism 13.

The incident slope 13c and the bottom surface 13b of the Dove prism 13 form an angle $\psi$, a sum of the angle $\psi$ and an incident angle $\alpha$ of the incident light onto the incident slope 13c of the Dove prism 13 is 90°, and an incident angle $\theta$ of the incident light onto the bottom surface 13b of the Dove prism 13 is equal to $$\arcsin\left(\frac{n_{Layer}}{n_{air}} \times \sin\alpha\right)\left(\theta = \arcsin\left(\frac{n_{Layer}}{n_{air}} \times \sin\alpha\right)\right),$$

where $n_{Layer}$ denotes a refractive index of a material for the first light-transparent layer 3, and $n_{air}$ denotes a refractive index of air. This ensures that, during a process in which the incident light passes through the first light-transparent layer 3 into the optical waveguide body 1 and is then dispersed into a plurality of spectral lines and during a process in which the plurality of spectral lines are transmitted to the exit slope 13d, the incident light and the plurality of spectral lines will not pass through the first light-transparent layer 3 and the second light-transparent layer 4 to go outside the light splitting device 100.

In some examples, a refractive index of a material for the Dove prism 13 is within a range from 1.8 to 1.9, inclusive. The angle $\psi$ is greater than zero and less than or equal to 56.25 ($0<\psi\leq56.25°$), and the incident angle $\alpha$ at the incident slope 13c is greater than or equal to 33.75° and less than 90° ($33.75°\leq\alpha<90°$). For example, the Dove prism 13 is made from $SiN_x$ with a refractive index of 1.8, and $\psi=54.7°$ or 47°. Of course, $\psi$ may be any other angle less than or equal to 56.25°.

Here, the structure of the dispersion grating 2 is diverse. The structure of the dispersion grating 2 may be selected according to actual requirements and will not be limited in some embodiments of the present disclosure.

In some examples, as shown in FIGS. 4 and 6, the dispersion grating 2 is an arrayed waveguide 21 formed in the top surface of the Dove prism 13. Here, a structure formed by the arrayed waveguide 21, the input waveguide 11 and the array of output waveguides 12 may be called an arrayed waveguide grating (AWG).

The arrayed waveguide 21 includes a plurality of first bent waveguides 211. For example, each of the plurality of first bent waveguides 211 is an arc-shaped waveguide. This can reduce the light loss of the incident light during the dispersion. Of course, the first bent waveguides 211 may be other waveguides that can reduce the light loss.

There is a second space A2 between any two adjacent first bent waveguides 211, and there is an optical path difference between any two adjacent first bent waveguides 211. The optical path difference is constant. In this way, the incident light can be diffracted in the arrayed waveguide 21 during its passing through the arrayed waveguide 21 to be dispersed into a plurality of spectral lines. Since there is an optical path difference between any two adjacent first bent waveguides 211, the dispersion grating 2 formed by the arrayed waveguide 21 can operate in a high-order mode. Thus, a plurality of high-resolution spectral lines can be obtained, without requiring a large focal length. Therefore, in the case where the arrayed waveguide 21 is applied to the light splitting device 100, the light splitting device 100 has good light splitting performance and can be miniaturized in size. Thus the production cost of the light splitting device 100 can be reduced.

As shown in FIGS. 4 and 6, extension directions of the plurality of first bent waveguides 211 included in the arrayed waveguide 21 are set according to derivation angles or propagation directions of the plurality of spectral lines derived by the Dove prism 13. For example, a cross-sectional shape of the Dove prism 13 in the direction perpendicular to, the first light-transparent layer 3 is a trapezoid, a length direction of a bottom side of the trapezoid is defined as a length direction of the Dove prism 13, and the extension directions of the plurality of first bent waveguides 211 are the same as the length direction of the Dove prism 13, In this case, the plurality of spectral lines can be emitted from the Dove prism 13 in a direction perpendicular to the first light-transparent layer 3 after being reflected by the exit slope 13d of the Dove prism 13.

In some embodiments, as shown in FIGS. 4 and 6, the optical waveguide body 1 includes the Dove prism 13, the dispersion grating 2 is the arrayed waveguide 21, and the array of output waveguides includes a plurality of guiding waveguides 121. The incident light passes through the first light-transparent layer 3 into the Dove prism 13, and then is incident onto the incident slope 13c. The incident light is reflected to the input waveguide 11 by the incident slope 13c. The incident light is transmitted to the arrayed waveguide 21 by the input waveguide 11, so that the transmitted incident light is incident into the arrayed waveguide 21. Since there is an optical path difference between any two adjacent first bent waveguides 211 of the plurality of first bent waveguides 211 included in the arrayed waveguide 21, the incident light will be diffracted in the arrayed waveguide 21 to form a plurality of spectral lines. The plurality of spectral lines are then transmitted, in one-to-one correspondence, to the exit slope 13d by the plurality of guiding waveguides 121 included in the array of output waveguides 12. The plurality of spectral lines are reflected by the exit slope 13d, so that the plurality of spectral lines can be derived from the Dove prism 13 and emitted from the first light-transparent layer 3.

For example, taking the incident light being white light at a range of from 380 nm to 780 nm (i.e., [380 nm, 780 nm]) and a dispersion target being 1 nm resolution as an example, the white light may be dispersed to (780-380)/1=400 spectral lines, and correspondingly, 400 guiding waveguides are needed. Assuming that each guiding waveguide is 10 μm in width and the first space A1 between any two adjacent guiding waveguides 121 is 1 μm in width, a space having a width or length of 400×11=4400 μm is needed to arrange the array of output waveguides 12.

It is to be noted that each first bent waveguide 211 and each guiding waveguide 121 may have a nanoscale or microscale thickness (the thickness direction is the same as the width direction of the first space A1). However, in order to reduce the difficulty in manufacturing the first bent waveguides 211, each first bent waveguide 211 is made to have a microscale thickness, and each guiding waveguide 121 is also made to have a microscale thickness. In this way, the difficulty in manufacturing the arrayed waveguide 21 is reduced to manufacturing of a microscale arrayed waveguide from the manufacturing and overlaying of a plurality of nano-gratings. This makes an industrial production of the light splitting device 100 possible.

FIG. 6 is a schematic diagram showing structures of a Dove prism, an input waveguide, an arrayed waveguide and an array of output waveguides according to some embodiments. As shown in FIG. 6, the optical waveguide body 1 included in the light splitting device 100 includes the Dove prism 13, the dispersion grating 2 is the arrayed waveguide 21 formed in the top surface 13a of the Dove prism 13 by imprinting or etching, the input waveguide 11 is a second bent waveguide formed in the top surface 13a of the Dove prism 13 by imprinting or etching, and the array of output waveguides 12 includes the plurality of guiding waveguides 121 formed in the top surface 13a of the Dove prism 13 by imprinting or etching. The optical path in the light splitting device 100 runs in the following way: the incident light is passed, at $0<\psi \leq 56.25°$ and $33.75° \leq \alpha<90°$, through the first light-transparent layer 3 onto the incident slope 13c of the Dove prism 13, then reflected by the incident slope 13c into the input waveguide 11 and further into the arrayed waveguide 21 in a direction parallel to the bottom surface 13b or the top surface 13a of the Dove prism 13, then diffracted by the arrayed waveguide 21 and dispersed into a plurality of spectral lines. The plurality of spectral lines are transmitted, in one-to-one correspondence, to the exit slope 13d of the Dove prism 13 by the plurality of guiding waveguides 121, reflected by the exit slope 13d, and emitted from the Dove prism 13 and the first light-transparent layer 3 in a direction perpendicular to the light-transparent layer 3.

The incident light is incident to the arrayed waveguide 21 in the direction parallel to the bottom surface 13b or the top surface 13a of the Dove prism 13, after being incident onto and reflected by the incident slope 13c. Considering the actual manufacturing process and the structure of the Dove prism 13, after the incident light is reflected by the incident slope 13c of the Dove prism 13, the reflected incident light is usually incident into the arrayed waveguide 21 in an oblique upward direction.

In some examples, in the light splitting device 100 provided in some embodiments of the present disclosure, a propagation direction of the incident light reflected by the incident slope 13c can be adjusted by the input waveguide 11, so that the incident light into the arrayed waveguide 21 enters the arrayed waveguide 21 in the direction as parallel as possible to the bottom surface 13b or the top surface 13a of the Dove prism 13.

In some other examples, in the light splitting device 100 provided in some embodiments of the present disclosure, by setting a height of the input waveguide 11 (i.e., a dimension of the input waveguide 11 in the direction perpendicular to the first light-transparent layer 3), a height of the plurality of first bent waveguides 211 included in the array waveguide 21 (i.e., a dimension of the plurality of first bent waveguides in the direction perpendicular to the first light-transparent layer 3), and a height of the plurality of guiding waveguides 121 included in the array of output waveguides 12 (i.e., a dimension of the plurality of guiding waveguides 121 in the direction perpendicular to the first light-transparent layer 3), the incident light reflected by the incident slope 13c of the Dove prism 13 can enter the arrayed waveguide 21 in, the direction parallel to (or approximatively parallel to) the bottom surface 13b or the top surface 13a of the Dove prism 13.

For example, the height of the Dove prism 13 (i.e., a dimension of the Dove prism 13 in the direction perpendicular to the first light-transparent layer 3) is within a range from 100 μm to 500 μm, inclusive, then the height of the input waveguide 11, the height of the plurality of first bent waveguides 211 included in the array waveguide 21 and the height of the plurality of guiding waveguides 121 included in the array of output waveguides 12 are all within a range from 0.8 μm to 1.5 μm, inclusive. For example, considering the implementability of the manufacturing process and the requirements for the incident light to enter the arrayed waveguide 21, the height of the input waveguide 11, the height of the plurality of first bent waveguides 211 included in the array waveguide 21 and the height of the plurality of guiding waveguides 121 included in the array of output waveguides 12 are all set as 1 μm.

The light efficiency of the light splitting device 100 provided in some embodiments of the present disclosure is estimated in the following way.

First, the incident light (for example, collimated light) is incident onto the incident slope 13c of the Dove prism 13 at $33.75° \leq \alpha < 90°$ and reflected by the incident slope 13c into the input waveguide 11. During this process, there are two aspects of loss in light efficiency: in the first aspect, during the incidence of the incident light into the Dove prism 13, part of incident light cannot be incident into the Dove prism 13 because of being reflected by the bottom surface 13b of the Dove prism 13, that is, this part of incident light cannot be incident onto the incident slope 13c; in the other aspect, the Dove prism 13 has a small height (i.e., the dimension of the Dove prism 13 along a direction from the first light-transparent layer 3 to the second light-transparent layer 4), usually only a few hundred nanometers, the incident slope 13c of the Dove prism 13 may be small in size, and may be thus unable to reflect all the incident light, that is, it may be unable to guide all the incident light into the input waveguide 11. Here, during the transmission of the incident light, the light efficiency is about 15% to 25%, for example, 20%.

Second, the arrayed waveguide 21 includes the plurality of first bent waveguides 211 (for example, arc-shaped waveguides). Part of light will be lost during the diffraction and dispersion of the incident light, which is reflected by the incident slope 13c, by the arrayed waveguide 21. For example, this part of incident light, lost by the plurality of first bent waveguides 211, is about 30%. Then, in the incident light reflected by the incident slope 13c, about 70% of the incident light is diffracted into a plurality of spectral lines by the arrayed waveguide 21.

Third, during the process in which the plurality of spectral lines are transmitted to the exit slope 13d by the array of output waveguides 12 (for example, the array of output waveguides 12 includes a plurality of arc-shaped waveguides) to be reflected by the exit slope 13d and thus emitted from the Dove prism 13, part of the plurality of spectral lines will be lost during their transmission in the array of output waveguides 12. For example, the lost part is 10% of the plurality of spectral lines. Then, 90% of the plurality of spectral lines are emitted from the Dove prism 13.

In conclusion, the light efficiency of the light splitting device 100 provided in some embodiments of the present disclosure is $I_{output}=I_{in}\times 20\%\times 70\%\times 90\%=12.6\%\times I_{in}$, where $I_{in}$ denotes the light efficiency of the incident light, and $I_{output}$ denotes the light efficiency of the plurality of spectral lines emitted from the Dove prism 13.

If the incident light is transmitted by conventional an, optical fiber and a light guide piece, and during the actual light splitting process, light passing through the first light-transparent layer 3 is supplied to the input waveguide 11 by the optical fiber, then the light efficiency into the input waveguide 11 may be approximatively considered as 20% (the light efficiency here usually depends upon the spot radius of the exit light from the optical fiber). In a case where the light is dispersed by a grating, the light efficiency is estimated to be about 90% (the light efficiency here usually depends upon the properties and type of the grating), and the light efficiency of the array of output waveguides 12 is estimated to be 90%. The dispersed spectral lines are derived by the grating. During the derivation of the spectral lines, the light efficiency is estimated to be about 20%. The final light efficiency of the spectral lines is $I_{output}=I_{in}\times 20\%\times 90\%\times 90\%\times 20\%=3.24\%\times I_{in}$.

It may be found from the above two light efficiency estimation results that, in the light splitting device 100 provided in sonic embodiments of the present disclosure, by transmitting the incident light by the Dove prism 13, dispersing the incident light into the plurality of spectral lines by the arrayed waveguide 21 disposed in the top surface 13a of the Dove prism 13, and deriving the plurality of spectral lines from the Dove prism 13, it is conducive to improve the light efficiency of the plurality of spectral lines.

Figure 5:
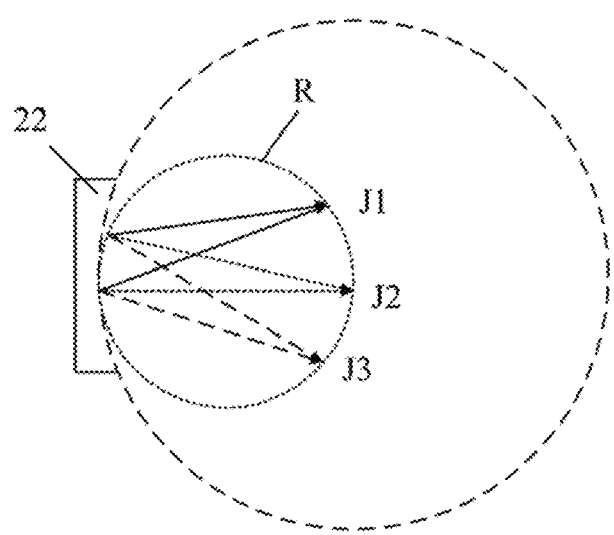
FIG. 5 is a schematic diagram showing a structure of a concave grating, according to some embodiments of the present disclosure.
Figure 7:
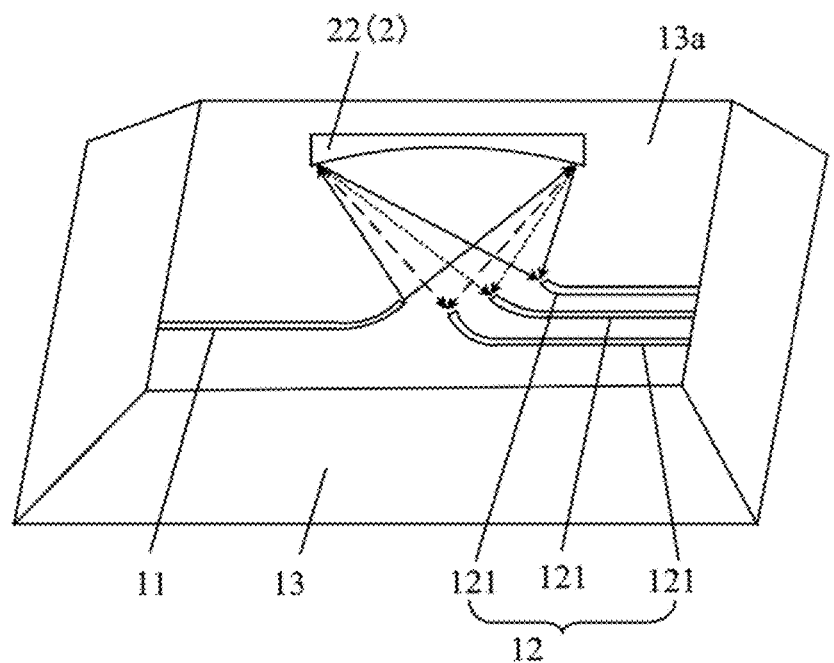
FIG. 7 is a schematic diagram showing structures of a Dove prism, an input waveguide, a concave grating and an array of output waveguides, according to some embodiments of the present disclosure.
Figure 8:
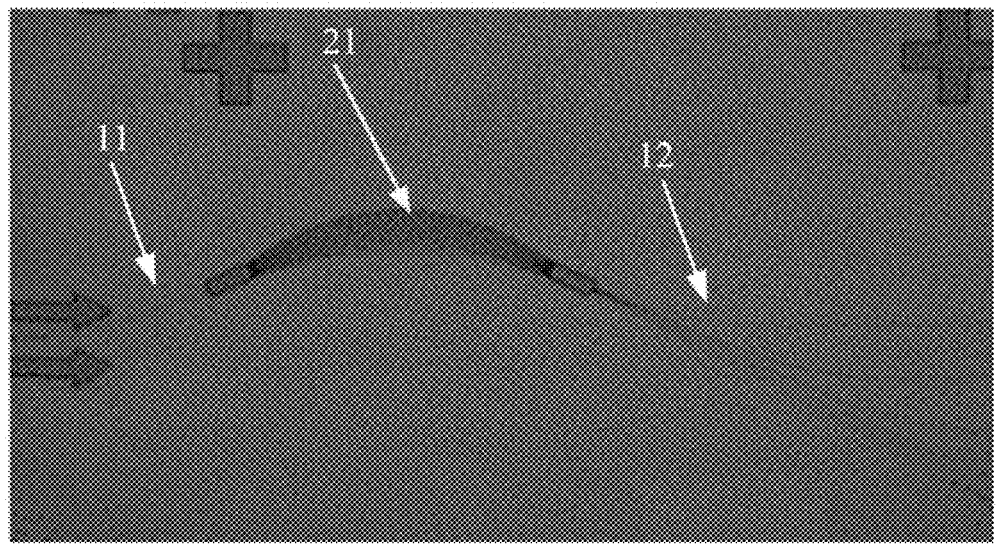
FIG. 8 is an electron micrograph of an input waveguide, an arrayed waveguide and an array of output waveguides, according to some embodiments of the present disclosure.

In some other examples, as shown in FIGS. 5 and 7, the dispersion grating 2 is a concave grating 22 formed in the top surface 13a of the Dove prism 13. A Rowland circle R of the concave grating 22 has a plurality of light focusing points J. The array of output waveguides 12 includes a plurality of guiding waveguides 121 in one-to-one correspondence to the plurality of spectral lines, The plurality of guiding waveguides 121 are further in one-to-one correspondence to the plurality of light focusing points J.

For example, the Rowland circle R has three light focusing points J: a first light focusing point J1, a second light focusing point J2 and a third light focusing point J3. Then, the array of output waveguides 12 includes three guiding waveguides 121 disposed, in one-to-one correspondence, at the three light focusing points J, to guide the spectral lines focused on the corresponding light focusing points J.

As shown in FIG. 5, the concave grating 22 is also called Rolland grating. The concave grating 22 can diffract light incident onto the concave grating 22 itself and also can focus the diffracted light. It is simple to manufacture the concave grating 22. For example, a concave grating 22 having diffracting and focusing functions can be formed by preparing a piece of concave optical glass and carving a series of uniformly-spaced lines on the concave surface of the piece of concave optical glass. The Rowland circle R of the concave grating 22 is a circle having a diameter the same as the radius of curvature of the concave grating 22, and the point of tangency between the concave surface of the concave grating 22 and the Rowland circle R is the center of the concave grating 22.

The optical path in the light splitting device 100 using the concave grating 22 as the dispersion grating 2 runs in the following way; the incident light is passed, at $0<\psi \le 56.25°$ and $33.75° \le \alpha < 90°$, through the first light-transparent layer 3 onto the incident slope 13c of the Dove prism 13, then reflected by the incident slope 13c into the input waveguide 11 (here, the input waveguide 11 is a waveguide that is bent to an arc shape) and further onto the concave grating 22 in the direction parallel to the bottom surface 13b or the top surface 13a of the 22 Dove prism 13, then diffracted by the concave grating 22 into a plurality of spectral lines. The plurality of spectral lines are respectively focused on corresponding light focusing points J of the Rowland circle and each transmitted to the exit slope 13d of the Dove prism 13 by a corresponding guiding waveguide 121 (here, the guiding waveguide 121 is a waveguide that is bent to an arc shape), reflected by the exit slope 13d, and emitted from the Dove prism 13 and the first light-transparent layer 3 in the direction perpendicular to the light-transparent layer 3.

Figure 9:
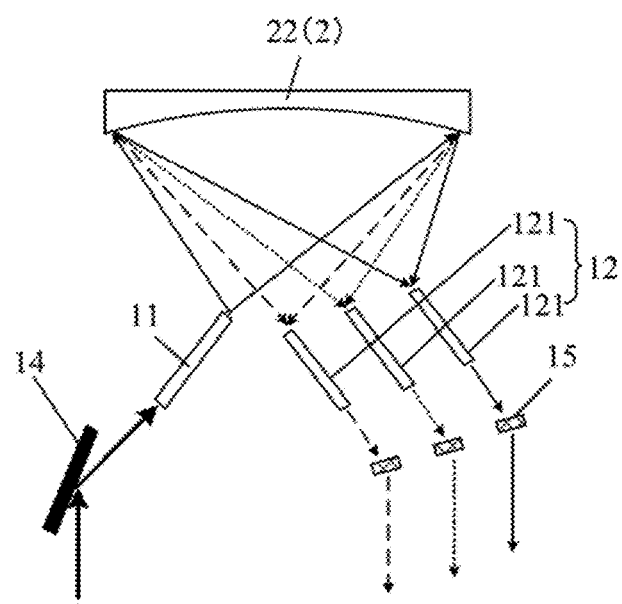
FIG. 9 is a schematic diagram showing structures of a reflecting structure, an input waveguide, a concave grating, an array of output waveguides and diffraction gratings, according to some embodiments of the present disclosure.

In some other embodiments, as shown in FIGS. 5 and 9, the optical waveguide body 1 is of a separated structure.

Here, the optical waveguide body 1 includes a reflecting structure 14 and a plurality of diffraction gratings 15. The dispersion grating 2 includes a concave grating 22. The array of output waveguides 12 includes a plurality of guiding waveguides 121. The plurality of guiding waveguides 121 are in one-to-one correspondence to the plurality of light focusing points J of the Rowland circle R of the concave grating 22. In these embodiments, the way of arranging the plurality of guiding waveguides 121 in one-to-one correspondence to the plurality of light focusing points J may refer to the way of arranging the plurality of guiding waveguides 121 in one-to-one correspondence to the plurality of light focusing points J as described in above some examples.

The reflecting structure 14 is configured to reflect the incident light and to supply the incident light to the input waveguide 11. The input waveguide 11 is configured to supply the incident light to the concave grating 22. The concave grating 22 is configured to diffract the incident light into a plurality of spectral lines, so that each of the plurality of spectral lines is focused on a corresponding light focusing point J. Each guiding waveguide 121 is configured to transmit a corresponding spectral line to a corresponding diffraction grating 15. Each of the plurality of diffraction gratings 15 is configured to control a corresponding spectral line to emit from the first light-transparent layer 3.

The structure of the reflecting structure 14 is diverse. For example, the reflecting structure 14 is a light-tight device having a reflecting film or other optical reflecting structures, as long as it can reflect the incident light onto the concave grating 22. The reflecting structure 14 is disposed on the circumference of the Rowland circle R.

Referring to FIG. 9, in a case where the optical waveguide body 1 is of a separated structure and the dispersion grating 2 is a concave grating 22, the optical path of the light splitting device 100 runs in the following way: the incident light is incident to the reflecting structure 14, reflected by the reflecting structure 14 to the input waveguide 11, transmitted by the input waveguide 11 onto the concave grating 22, and diffracted by the concave grating 22 into a plurality of spectral lines. The plurality of spectral lines are respectively focused on corresponding light focusing points J on the circumference of the Rowland circle R, guided and transmitted to corresponding diffraction gratings 15 by corresponding guiding waveguides 121, and passed through the first light-transparent layer 3 under the control of corresponding diffraction gratings.

In some examples, each guiding waveguide 121 corresponds to one diffraction grating 15. In this way, the spectral line transmitted by a corresponding guiding waveguide 121 can be control independently by each diffraction grating 15. It is conducive to improve the precision of controlling the spectral line and the precision for each spectral line to pass through first light-transparent layer 3.

During actual production, in a case where the optical waveguide body 1 is of a separated structure, the light splitting device 100 is manufactured by overlaying. That is, the concave grating 22, the reflecting structure 14, the array of output waveguides 12 and the diffraction gratings 15 are manufactured by overlaying. Or, the light splitting device 100 is formed by assembling the input waveguide 11, the concave grating 22, the reflecting structure 14, the array of output waveguides 12 and the diffraction gratings 15, which can realize their own functions, according to a desired optical path running direction.

Figure 12:
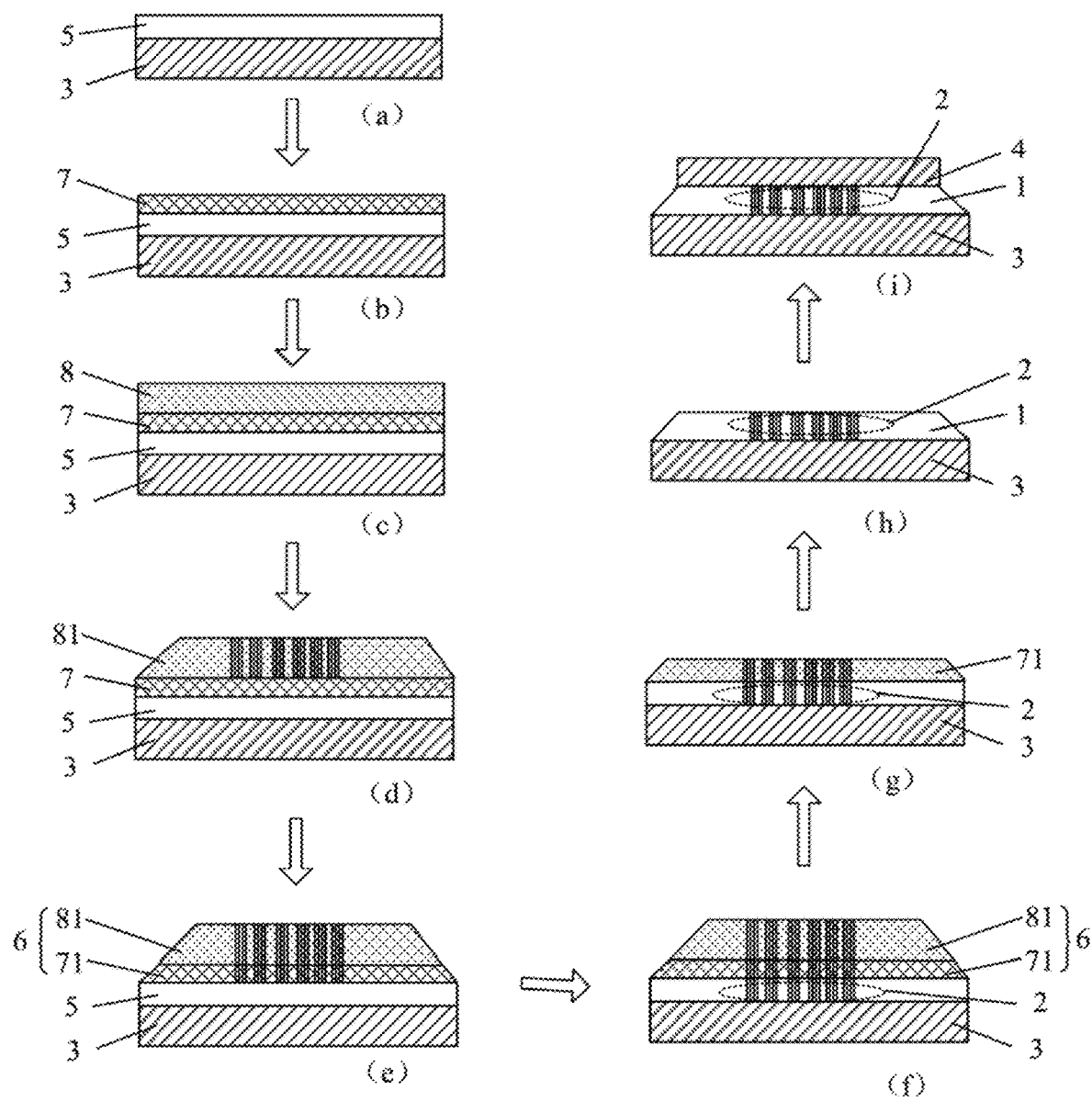
FIG. 12 shows a flow diagram of manufacturing a light splitting device, according to some embodiments of the present disclosure.
Figure 13:
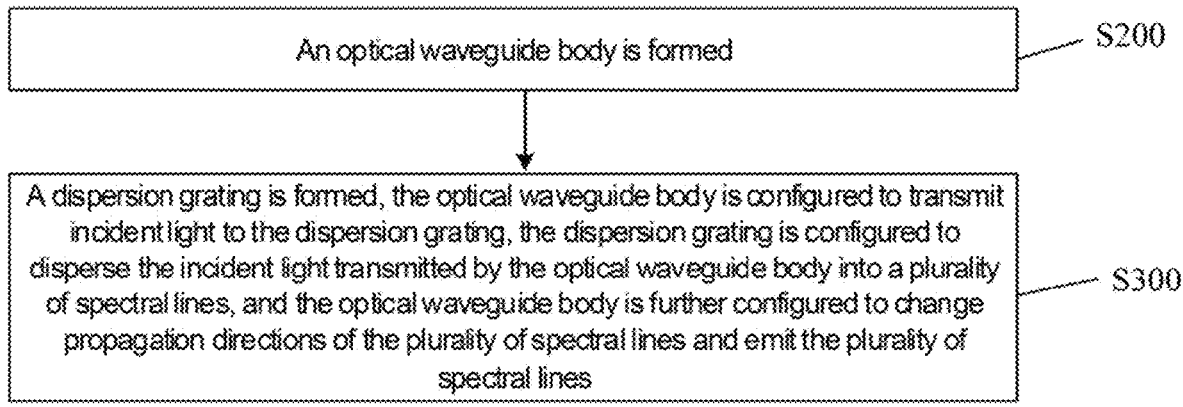
FIG. 13 is a flow diagram showing a method for manufacturing a light splitting device according to some embodiments of the present, disclosure.

As shown in FIGS. 12 and 13, some embodiments of the present disclosure provide a method for manufacturing a light splitting device. The method for manufacturing a light splitting device includes S200 to S300.

In S200, an optical waveguide body 1 is formed.

In S300, a dispersion grating 2 is formed. Here, the optical waveguide body 1 is configured to transmit incident light to the dispersion grating 2. The dispersion grating 2 is configured to disperse the incident light transmitted by the optical waveguide body 1 into a plurality of spectral lines, and the optical waveguide body 1 is further configured to change propagation directions of the plurality of spectral lines and to emit the plurality of spectral lines.

Here, numbering the steps for manufacturing a light splitting device 100 does not form any limitation to the order of forming the optical waveguide body 1 and forming the dispersion grating 2. For example, the light splitting device 100 may be manufactured in the following order; the optical waveguide body 1 is formed first and then the dispersion grating 2 is formed. Or, the light splitting device 100 may be manufactured in the following order: the dispersion grating 2 is formed first and then the optical waveguide body 1 is formed.

The beneficial effects that can be realized by the method for manufacturing a light splitting device provided in some embodiments of the present disclosure are the same as those that can be realized by the light splitting device 100 provided in above some embodiments, and will not be repeated here.

In some embodiments, as shown in FIG. 12, the method for manufacturing a light splitting device further includes S100.

In S100, as shown in (a) of FIG. 12, a first light-transparent layer 3 is formed. A refractive index of a material for the first light-transparent layer 3 is less than both a refractive index of a material for the optical waveguide body 1 and a refractive index of a material for the dispersion grating 2.

Here, the first light-transparent layer 3 is a glass substrate, or is made from a material such as optical glass, or transparent resin.

In some examples, the first light-transparent layer 3 is formed before the formation of the optical waveguide body 1 and the dispersion grating 2.

In some, embodiments, the method for manufacturing a light splitting device further includes S400.

In S400, as shown in (i) of FIG. 12, a second light-transparent layer 4 is formed. The first light-transparent layer 3 is opposite to the second light-transparent layer 4, with a certain distance reserved between them. The optical waveguide body 1 is disposed between the first light-transparent layer 3 and the second light-transparent layer 4, and the dispersion grating 2 is disposed between the second light-transparent layer 4 and the optical waveguide body 1. A refractive index of a material for the second light-transparent layer 4 is less than both the refractive index of the material for the optical waveguide body 1 and the refractive index of the material for the dispersion grating 2.

Here, the second light-transparent layer 4 is a glass substrate, or is made from a material such as resin (for example, photoresist) or $SiO_2$.

In some examples, the second light-transparent, layer 4 is formed after the formation of the optical waveguide body 1 and the dispersion grating 2.

Figure 14:
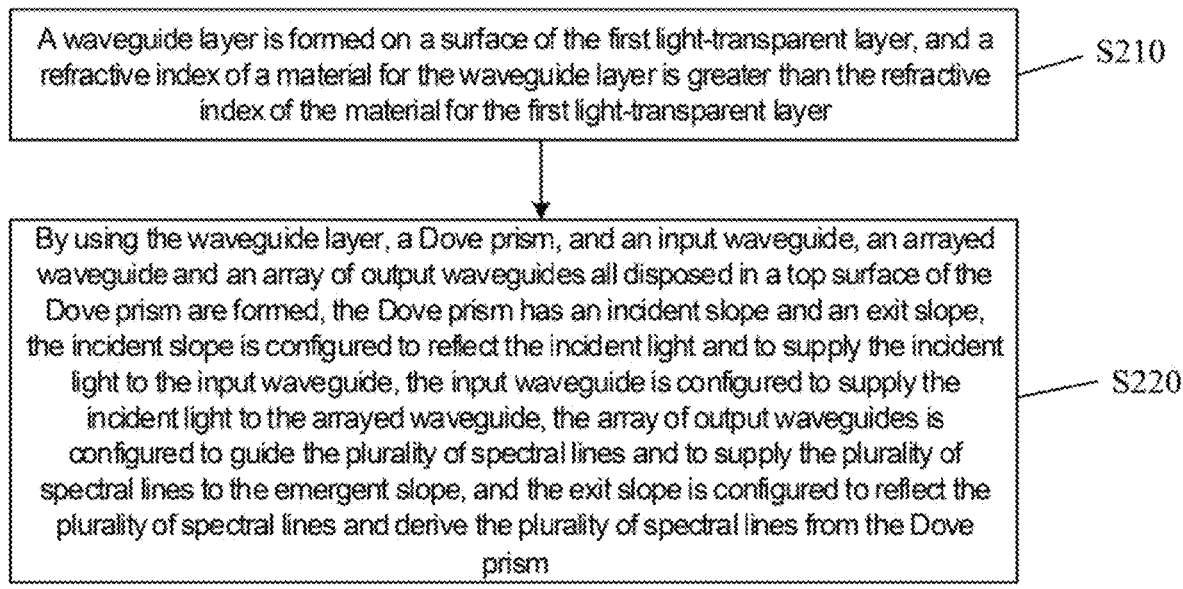
FIG. 14 is a flow diagram showing a method for manufacturing another light splitting device, according to some embodiments of the present disclosure.

In some embodiments, as shown in FIGS. 12 and 14, the optical waveguide body 1 includes the Dove prism 13, and the dispersion grating 2 is the arrayed waveguide 21. Forming the optical waveguide body 1 and forming the dispersion grating 2, includes S210 to S220.

In S210, as shown in (a) of FIG. 12, a waveguide layer 5 is formed on a surface of the first light-transparent layer 3, and a refractive index of a material for the waveguide layer 5 is greater than the refractive index of the material for the first light-transparent layer 3. The waveguide layer 5 is made from, for example, $SiN_x$ (silicon nitride).

For example, the waveguide layer 5 is formed on the surface of the first light-transparent layer 3 by magnetron sputtering or plasma enhanced chemical vapor deposition.

In S220, as shown in (h) of FIG. 12, by using the waveguide layer 5, a Dove prism 13, and an input waveguide 11, an arrayed waveguide 21 and an array of output waveguides 12 all disposed in, a top surface 13a of the Dove prism 13 are formed.

Here, the Dove prism 13 has an incident slope 13c and an exit slope 13d.

The incident slope 13c is configured to reflect the incident light transmitted to the Dove prism 13 and to supply the incident light to the input waveguide 11. The input waveguide 11 is configured to supply the incident light reflected by the incident slope 13c to the arrayed waveguide 21. The array of output waveguides 12 is configured to guide the plurality of spectral lines and to supply the plurality of spectral lines to the exit slope 13d. The exit slope 13d is configured to reflect the plurality of spectral lines and derive the plurality of spectral lines from the Dove prism 13.

In some embodiments, a shown in FIGS. 12 and 15, forming, by using the waveguide layer 5, a Dove prism 13, and an input waveguide 11, an arrayed waveguide 21 and an array of output waveguides 12 all disposed in a top surface 13a of the Dove prism 13, includes S221 to S223.

In S221, an optical mask 6 is provided above the waveguide layer 5. Here, the optical mask has patterns that are in one-to-one correspondence to the Dove prism 13, the input waveguide 11, the arrayed waveguide 21 and the array of output waveguides 12.

In S222, by using the optical mask 6, the waveguide layer 5 is processed to obtain the Dove prism 13, and the input waveguide 11, the arrayed waveguide 21 and the array of output waveguides 12 all disposed in the top surface 13a of the Dove prism 13. Here, the incident slope 13c and a bottom surface 13b of the Dove prism 13 form an angle ψ, a sum of the angle ψ and an incident angle α of the incident light onto the incident slope 13c of the Dove prism 13 is 90°, and an incident angle θ of the incident light onto the bottom surface 13b of the Dove prism 13 is equal to $$\arcsin\left(\frac{n_{Layer}}{n_{air}} \times \sin\alpha\right) \left(\theta = \arcsin\left(\frac{n_{Layer}}{n_{air}} \times \sin\alpha\right)\right),$$

where $n_{Layer}$ denotes the refractive index of the material for the first light-transparent layer 3, and $n_{air}$ denotes a refractive index of air.

For example, by using the optical mask 6 as a mask, the waveguide layer 5 is processed by dry etching to obtain the Dove prism 13, and the input waveguide 11, the arrayed waveguide 21 and the array of output waveguides 12 all disposed in the top surface 13a of the Dove prism 13.

Here, the optical mask 6 has been formed before S221. Therefore, the Dove prism 13, the input waveguide 11, the arrayed waveguide 21 and the array of output waveguides 12 may be formed in one dry etching process. For example, the dry etching process is an inductive coupled plasma (ICP) dry etching process, or other implementable dry etching processes.

In S223, the optical mask 6 is removed.

The method for removing the optical mask 6 is determined by the material for the optical mask 6, and will not be described herein.

In some embodiments, as shown in FIGS. 12 and 16, providing an optical mask 6 above the waveguide layer 5 includes S2211 to S2214.

In S2211, as shown in (b) of FIG. 12, a metal film 7 is formed on a surface of the waveguide layer 5 facing away from the first light-transparent layer 3.

For example, the metal film 7 is formed on the surface of the waveguide layer 5 facing away from the first light-transparent layer 3 by sputtering.

In S2212, as shown in (c) of FIG. 12, a photoresist layer 8 is formed on a surface of the metal film 7 facing away from the waveguide layer 5.

For example, the photoresist layer 8 is formed on the surface of the metal film 7 facing away from the waveguide layer 5 by spin-coating or coating.

In S2213, as shown in (d) of FIG. 12, the photoresist layer 8 is processed by imprinting to obtain a photoresist mask 81. Here, the photoresist mask 81 has patterns that are in one-to-one correspondence to the Dove prism 13, the input waveguide 11, the arrayed waveguide 21 and the array of output waveguides 12.

For example, the process for processing the photoresist layer 8 by imprinting cludes: imprinting a mother mask for the Dove prism, a mother mask for the input waveguide, a mother mask for the arrayed waveguide and a mother mask for the array of output waveguides onto the photoresist layer 8, so that the photoresist layer 8 forms the photoresist mask 81.

Here, the photoresist layer 8 is processed by imprinting. An imprinting template to be used in manufacturing the photoresist mask 81 may be made in the following way.

P-type or N-type monocrystalline silicon is etched by wet etching (an etching solution is KOH solution, NaOH solution or $HNO_3$ solution). The mother mask for the Dove prism, which meets the requirements for the Dove prism 13, is obtained according to the etching rate of different crystal faces of the monocrystalline silicon by the etching solutions used in wet drying.

For example, a Dove prism 13 having an angle of 54.7° can be formed by imprinting the (111) crystal face of the monocrystalline silicon, and a Dove prism 13 having an angle of 47° can be formed by imprinting the (100) crystal face of the monocrystalline silicon.

In S2214, as shown in (e) of FIG. 12, the metal film 7 is processed by using the photoresist mask 81 to obtain a metal mask 71. The metal mask 71 has patterns that are in one-to-one correspondence to the Dove prism 13, the input vvaveguide 11, the arrayed waveguide 21 and the array of output wave aides, 12. The metal mask 71 and the photoresist mask 81 together form the optical mask 6.

For example, the metal film 7 is made from materials such as Al, Cu, Au or Mo. The metal film 7 is etched by dry etching.

In some embodiments, as shown in (f) to (h) of FIG. 12, removing the optical mask 6, includes removing the photoresist mask 81 and removing the metal mask 71. For example, the photoresist mask 81 is removed by a chemical solvent, or the photoresist mask 81 is ashed by oxygen plasma treatment. For example, the metal mask 71 is removed by a chemical solvent or by other physical methods.

As described above, during the manufacturing of the optical mask 6, the photoresist mask 81 is formed by imprinting first and then the metal film 7 is processed by using the photoresist mask 81 as a mask to form the metal mask 71. Since an etch selection ratio of a metal material and the material for the waveguide layer 5 is large, sidewalls of openings corresponding to the patterns of the metal mask 71 is perpendicular (or approximatively perpendicular) to the first light-transparent layer 3. In this way, in a case where the waveguide layer 5 is processed by using the optical mask 6, the formed Dove prism 13, the input waveguide 11, the arrayed waveguide 21 and the array of output waveguides 12 may be regular in shape and high in precision. This facilitates the dispersion of the incident light.

In addition, in some embodiments of the present disclosure, in a case where the optical waveguide body 1 is of an integral structure, the input waveguide 11, the arrayed waveguide 21 and the array of output waveguides 12 have a microscale size. In this way, during the manufacturing of the input waveguide 11, the arrayed waveguide 21 and the array of output waveguides 12, the input waveguide 11, the arrayed waveguide 21 and the array of output waveguides 12 can be manufactured without overlaying. Thus, the process for manufacturing the light splitting device 100 is simplified and the efficiency in manufacturing the light splitting device 100 is improved.

In a case where the optical waveguide body 1 is of a separated structure and the dispersion grating 2 is a concave grating 22, the perpendicularity of sidewalls of the concave grating 22 is directly related to the diffraction efficiency. Therefore, the precision for manufacturing the concave grating 22 is high. The difficulty in industrial production is high. In this case, the light splitting device 100 is manufactured by overlaying.

Figure 17:
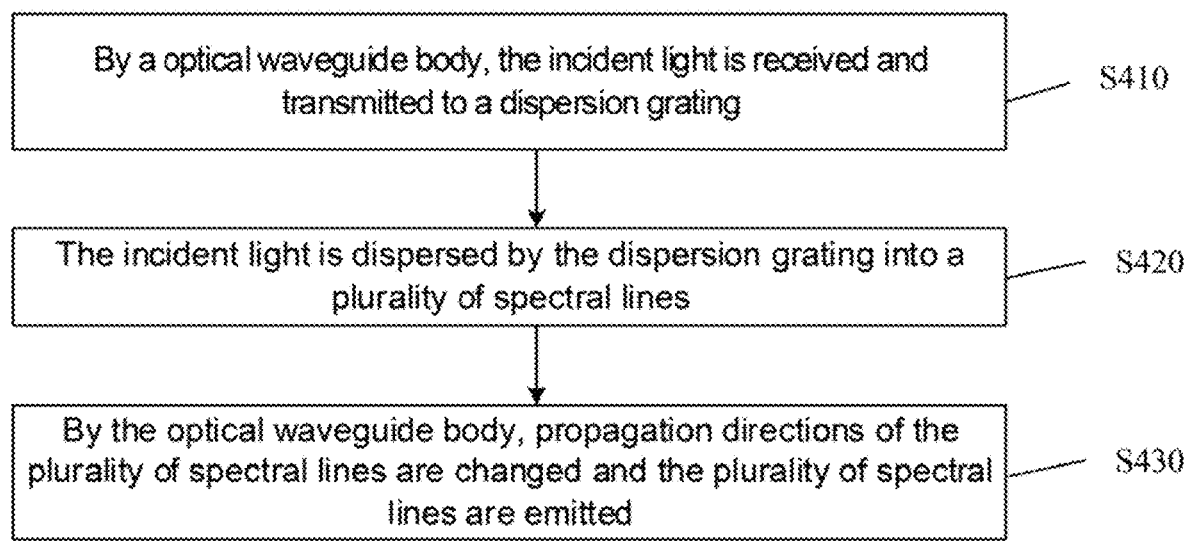
FIG. 17 is a flow diagram showing a method for dispersing light according to some embodiments of the present disclosure.

As shown in FIG. 17, some embodiments of the present disclosure provide a method for dispersing light using the light splitting device 100 provided in the above embodiments. The method for dispersing light includes S410 to S430.

In S410, by an optical waveguide body 1, the incident light is received and transmitted to a dispersion grating 2.

In S420, the incident light is dispersed by the dispersion grating 2 into into a plurality of spectral lines.

In S430, by the optical waveguide body 1, propagation direction the plurality of spectral lines are changed and the plurality of spectral lines are emitted.

The beneficial effects that can be realized by the method for dispersing light provided in some embodiments of the present disclosure are the same as, those that can be realized by the light splitting device 100 provided in above some embodiments, and will not be repeated here.

In some embodiments, the optical waveguide body 1 includes a Dove prism 13, the dispersion grating 2 is an arrayed waveguide 21, and the optical waveguide body 1 further includes an input waveguide 11 and an array of output waveguides 12. The method for dispersing light includes S410a to S430a.

In S410a, the incident light passes through the first light-transparent layer 3 to the incident slope 13c of the Dove prism 13, and is then reflected by the incident lope 13c to the arrayed waveguide 21.

In S420, the incident light is diffracted by the arrayed waveguide 21 into a plurality of spectral lines. The arrayed waveguide 21 further transmits the plurality of spectral lines to the array of output waveguides 12. The array of output waveguides 12 guides the plurality of spectral lines to the exit slope 13d of the Dove prism 13.

In S430a, the plurality of spectral lines are reflected by the exit slope 13d of the Dove prism 13, so that the plurality of spectral lines are changed their propagation directions and then derived from the first light-transparent layer 3.

In some other embodiments, the optical waveguide body 1, which is of a separated structure, includes a reflecting structure and a plurality of diffraction gratings, the dispersion grating 2 is a concave grating 22, and the optical waveguide body 1 further includes an input waveguide 11 and an array of output waveguides 12. The method for dispersing light includes S410b to S430b.

In S410b, the incident light passes through the first light-transparent layer 3 to the reflecting surface of the reflecting structure, and is then reflected by the reflecting surface to the input waveguide 11. The incident light is transmitted to a concave surface of the concave grating 22 by the input waveguide 11.

In S420b, the incident light is diffracted by the concave surface of the concave grating 22 to obtain a plurality of spectral lines. The plurality of spectral lines are focused, in one-to-one correspondence, on a plurality of light focusing points J on a Rowland circle R of the concave grating 22. The corresponding spectral line is guided to a corresponding diffraction grating 15 by a guiding waveguide 121 disposed at each light focusing point J.

In S430b, each diffraction grating 15 controls the corresponding spectral line to emit from the first light-transparent layer 3.

As shown in FIGS. 10 and 11, some embodiments of the present disclosure provide a spectrometer 1000. The spectrometer 1000 includes the light splitting device 100 provided in the above embodiments.

The spectrometer 1000 is diverse n type. For example, the spectrometer 1000 is a conventional spectrometer or a micro-spectrometer The spectrometer 1000 can be applied to spectral, analysis in physical, chemical, biological or other fields, and also can be applied to substance inspection, calibration, molecular diagnosis, food inspection, classification of bacteria, etc.

The light splitting device 100 in the spectrometer 1000 provided in some embodiments of the present disclosure has the same beneficial effects as the light splitting device 100 provided in the above embodiments, and will not be repeated here.

In some embodiments, as shown in FIG. 10, the light splitting device 100 includes a first light-transparent layer 3 and a second light-transparent layer 4 that are opposite to each other. The collimated light source 200 included in the spectrometer 1000 is configured to supply the incident light (i.e., collimated light) to the light splitting device 100, that is, the collimated light source 200 is configured to supply the incident light to the optical waveguide body 1 in the light splitting device 100.

A structure of the collimated light source 200 is diverse. In some examples, the collimated light source 200 is a collimated light source that supplies light to an optical fiber or a collimated micro-light emitting diode (micro-LED) chip that has high collimation. Here, the collimated micro-LED chip is low in production cost. The use of the collimated, micro LED chip as the collimated light source 200 can effectively reduce the cost of the spectrometer 1000. The color of the incident light supplied by the collimated light source 200 is set according to actual requirements. For example, the incident light is white light. Of course, the incident light is not limited to white light.

A position of the collimated light source 200 may be diverse in the spectrometer 1000.

In some examples, the collimated light source 200 is disposed at a side of the second light-transparent layer 4 facing away from the first light-transparent layer 3. That is, the incident light supplied by the collimated light source 200 is incident into the optical waveguide body 1 through the second light-transparent layer 4.

In some other examples, the collimated light source 200 is disposed at a side of the first light-transparent layer 3 facing away from the second light-transparent layer 4. That is, the incident light supplied by the collimated light source 200 is incident into the optical waveguide body 1 through the first light-transparent layer 3.

Here, in a case where the collimated light source 200 is disposed at the side of the first light-transparent layer 3 facing away from the second light-transparent layer 4, a light outlet of the collimated light source 200 is opposite to the surface of the first light-transparent layer 3 facing away from the optical waveguide body 1, in order to ensure that the incident light supplied by the collimated light source 200 can be incident into the optical waveguide body 1.

On this basis, the arrangement of the collimated light source 200 at a side of the first light-transparent layer 3 facing away from the second light-transparent layer 4 is related to the structure of the optical waveguide body 1.

For example, the optical waveguide body 1 is of an integral structure. Here, the optical waveguide body 1 includes a Dove prism 13. An orthographic projection of the incident slope 13c of the Dove prism 13 in a plane of the first light-transparent layer 3 is at least overlapped with an orthographic projection of the light outlet of the collimated light source 200 in the plane of the first light-transparent layer 3. This can ensure that the incident light supplied by the collimated light source 200 can be incident to the incident slope 13c. An excessive divergence of the incident light may be avoided.

For example, the optical waveguide body 1 is of a separated structure. The optical waveguide body includes a reflecting structure 14. An orthographic projection of a reflecting surface of the reflecting structure 14 in the plane of the first light-transparent layer 3 is at least overlapped with the orthographic projection of the light outlet of the collimated light, source 200 in the plane of the first light-transparent layer 3. This can ensure that the incident light supplied by the collimated light source 200 can be incident to the reflecting surface of the reflecting structure 14. The excessive divergence of the incident light may be avoided.

In some embodiments, as shown in FIG. 10, in the case where the spectrometer 1000 is applied to the detection of micro-fluids, the spectrometer 1000 further includes a micro-fluidic substrate 300 and a sensing substrate 400.

The micro-fluidic substrate 300 is disposed at a side of the first light-transparent layer 3 facing away from the second light-transparent layer 4. And, the micro-fluidic substrate 300 corresponds to exit positions for the plurality of spectral lines. That is, the plurality of spectral lines can be incident into the micro-fluidic substrate 360 after being emitted from the light splitting device 100. Thus, micro-fluids in the micro-fluidic substrate 200 can have certain physical or chemical changes when irradiated by the plurality of spectral lines, so that the plurality of spectral lines can carry information about the micro-fluids in the micro-fluidic substrate 300 after passing through the micro-fluidic substrate 300.

The sensing substrate 400 is opposite to the micro-fluidic substrate 300 and is configured to detect the plurality of spectral lines passing through the micro-fluidic substrate 300. That is, the plurality of spectral lines emitted from the micro-fluidic substrate 300 can be correspondingly incident to the sensing substrate 400, so that the plurality of spectral lines are detected by the sensing substrate 400 to obtain the information about the micro-fluids, which is carried by the plurality of spectral lines. Thus, the detection of micro-fluid can be realized.

In some examples, referring to FIG. 10, the micro-fluidic substrate 300 and the light splitting device 100 are misaligned. In this way, the collimated light source 200 is disposed at a position corresponding to a part of the light splitting device 100 protruding from the micro-fluidic substrate 300, in order to ensure that the incident light supplied by the collimated light source 200 can be incident to the light splitting device 100 from a side of the first light-transparent layer 3 facing away from the second light-transparent layer 4, and the plurality of spectral lines can be emitted to the micro-fluidic substrate 300 from a side of the first light-transparent layer 3 facing away from the second light-transparent layer 4. In this way, a structure of the spectrometer 1000 can be made more compact. This facilitates the miniaturization of the spectrometer 1000.

In a case where the micro-fluidic substrate 300 and the light splitting device 100 are misaligned, the sensing substrate 400 and the light splitting device 100 are also misaligned, in order to leave a larger space to accommodate the collimated light source 200. This provides a wider range for a size of the collimated light source 200.

In some embodiments, as shown in FIG. 10, the micro-fluidic substrate 300 includes a first base substrate 300, and a reaction tank 320, a waste reservoir 330 and a plurality of micro-fluidic channels 340 all disposed at a side of the first base substrate 310 proximate to the first light-transparent layer 3. The arrangement of the reaction tank 320, the waste reservoir 330 and the plurality of micro-fluidic channels 340 at the side of the first base substrate 310 proximate to the first light-transparent layer 3 can prevent the micro-fluids from being influenced by the gravity. The plurality of micro-fluidic channels 340 are communicated with the reaction tank 320 and the waste reservoir 330, respectively, Contact adjustment layers are formed on inner walls of the plurality of micro-fluidic channels 340. The plurality of micro-fluidic channels 340 are in one-to-one correspondence with the plurality of spectral lines.

In some examples, the first base substrate 310 is diverse in type. For example the first base substrate 310 is a flexible substrate, and the flexible substrate is a polydimethylsiloxane (PDMS) substrate or polymethyl methacrylate (PMMA) substrate. Of course, the flexible substrate is not limited thereto. For example, the first base substrate 310 is a rigid substrate that is a glass substrate or silicon substrate, etc. Here, a surface of the rigid substrate is usually covered with a photoresist layer.

In some examples, the reaction tank 320, the plurality of micro-fluidic channels 340 and the waste reservoir 330 are formed on the first base substrate 310 by conventional exposure and developing, etching, or other patterning processes.

In some examples, the plurality of micro-fluidic channels 340 are blind holes formed in the first base substrate 310. Here, a radial length and an axial length of the plurality of micro-fluidic channels 340 are designed according to the bandwidth of the specific spectral lines. The unit for the radial length and axial length is micron, nanometer or angstrom, depending upon the actual conditions.

Here contact adjustment layers are formed on the inner walls of the plurality of micro-fluidic channels 340. By the contact adjustment layers the micro-fluids in the micro-fluidic channels 340 can flow or stay transiently according to experimental requirements. In some examples, the contact adjustment layer is a hydrophilic film or hydrophobic film. For example, the micro-fluid is hydrophilic substance and the contact adjustment layer is a polytetrafluoroethylene AF (Teflon-AF) hydrophobic film. In this case, the adhesion of the micro-fluids in the plurality of micro-fluidic channels 340 can be avoided, the flowing of the micro-fluids in the plurality of micro-fluidic channels 340 can be quickened.

The plurality of micro-fluidic channels 340 are in one-to-one correspondence to the plurality of spectral lines. That is, positions of the plurality of micro-fluidic channels 340 are in one-to-one correspondence to positions of the plurality of spectral lines to be emitted from the light splitting device 100. In this way, the plurality of spectral lines can be incident, in one-to-one correspondence, into the plurality of micro-fluidic channels 340 after being emitted from the light splitting device 100. In some examples, the plurality of spectral lines are incident, in one-to-one correspondence and vertically, into the plurality of micro-fluidic channels 340 in the direction perpendicular to the first light-transparent layer 3, in order to ensure that the plurality of spectral lines can better detect the micro-fluids. Here the formation positions of the plurality of micro-fluidic channels 340 on the first base substrate 310 can be adjusted according to the directions for the plurality of spectral lines, to be emitted from the light splitting device 100. The directions for the plurality of spectral lines to be emitted from the light splitting device 100 can be adjusted by adjusting positions of the input waveguide 11, the dispersion grating 2 and the array of output waveguides 12 in the light splitting device 100.

During the detection of the micro-fluids, the micro-fluids may react in the reaction tank 320. This reaction may be a chemical reaction, or may be physical change. The reacted micro-fluids enter the plurality of micro-fluidic channels 340. The plurality of spectral lines emitted from the light splitting, device 100 enter, in one-to-one correspondence, the plurality of micro-fluidic channels 340 to detect the reacted micro-fluids, so that the plurality of spectral lines carry information about the micro-fluid.

In some embodiments, as shown in FIG. 10, the sensing substrate 400 includes a second base substrate 410, and a plurality of photosensitive detectors 420 disposed at side of the second base substrate 410 proximate to the first base substrate 310.

The plurality of photosensitive detectors 420 are diverse in type. For example, the plurality of photosensitive detectors 420 are charge coupled device (CCD) image sensors, complementary metal oxide semiconductor (CMOS) detectors, positive-intrinsic-negative (PIN) photodiode detectors, etc.

Here, an orthographic projection of each of the plurality of photosensitive detectors 410 on the second base substrate 410 is within an orthographic projection of one of the plurality of micro-fluidic channels 340 on the second base substrate 420. That is, each micro-fluidic channel 340 corresponds to at least one photosensitive detector 420. This can ensure that the information about the micro-fluid, which is carried by each spectral line when passing through a corresponding micro-fluidic channel 340, can be detected by at least one photosensitive detector 420. In a case where each micro-fluidic channel 340 corresponds to more photosensitive detectors 420, the sensitivity of detection of the micro-fluids will be higher.

A distance between the micro-fluidic substrate 300 and each photosensitive detector 420 is related to the signal-to-noise ratio of the photosensitive detector 420, and also related to exit directions of the plurality of spectral lines supplied by the light splitting device 100. Regardless, the close contact of micro-fluidic substrate 300 with the photosensitive detector 420 can better ensure that the plurality of spectral lines passing through the micro-fluidic substrate 300 can be detected by the photosensitive detectors 420. On this basis, the arrangement of the plurality of photosensitive detectors 420 on the surface of the second base substrate 410 proximate to the first base substrate 310 can make the distance between the photosensitive detector 420 and the micro-fluidic substrate 300 as small as possible.

In some examples, as shown in FIG. 10, a buffer layer 500 is disposed between the micro-fluidic substrate 300 and the sensing substrate 400. By the buffer layer 500, the photosensitive detectors 420 can be protected. Here, the buffer layer 500 has a small thickness, to avoid the impact of the buffer layer 500 on the transmission of the spectral lines.

In the description of the above implementations, the specific features, structures, materials, or characteristics may be combined in a proper manner in any one or more embodiments or examples.

The above description is only the specific embodiment of the present invention, however, the protection scope of the present invention is not limited to this, any skilled who is familiar with the technical area can readily think of changes or alternatives in the technical scope of the disclosed invention, which should be covered in the protection scope of the present invention. Therefore, the protection scope of the claims should be as a criterion of the protection scope of the present invention.

What is claimed is:

1. A light splitting device, comprising: an optical waveguide body, a dispersion grating, and a first light-transparent layer and a second light-transparent layer that are opposite to each other, wherein
the optical waveguide body and the dispersion grating are disposed between the first light-transparent layer and the second light-transparent layer; the optical waveguide body is configured to transmit incident light to the dispersion grating, the dispersion grating is configured to disperse the incident light transmitted by the optical waveguide body into a plurality of spectral lines, and the optical waveguide body is further configured to change propagation directions of the plurality of spectral lines and to emit the plurality of spectral lines; and a refractive index of a material for the optical waveguide body and a refractive index of a material for the dispersion grating are both greater than a refractive index of a material for the first light-transparent layer and are both greater than a refractive index of a material for the second light-transparent layer, wherein the optical waveguide body includes: an input waveguide, an array of output waveguides and a Dove prism;

the input waveguide is configured to supply received incident light to the dispersion grating;

the array of output waveguides is configured to guide the plurality of spectral lines and to emit the plurality of spectral lines; and the Dove prism includes: a bottom surface and a top surface that are opposite to each other, and an incident slope and an exit slope that are opposite to each other, wherein the bottom surface faces the first light-transparent layer; the top surface faces the second light-transparent layer, and the input waveguide, the array of output waveguides and the dispersion grating are all directly disposed in the top surface; the incident slope is configured to reflect the incident light irradiated into the Dove prism and to supply the reflected incident light to the input waveguide; and the exit slope is configured to reflect the plurality of spectral lines emitted from the array of output waveguides and to derive the plurality of spectral lines from the Dove prism.

2. The light splitting device according to claim 1, wherein the array of output waveguides includes a plurality of guiding waveguides in one-to-one correspondence to the plurality of spectral lines, and there is a first space between any two adjacent guiding waveguides of the plurality of guiding waveguides.

3. The light splitting device according to claim 2, wherein the dispersion grating includes an arrayed waveguide, wherein the arrayed waveguide includes a plurality of first bent waveguides, there is a second space between any two adjacent first bent waveguides of the plurality of first bent waveguides, and there is an optical path difference between any two adjacent first bent waveguides; and the input waveguide is disposed at a light entry side of the arrayed waveguide, and the array of output waveguides is disposed at a light exit side of the arrayed waveguide.

4. The light splitting device according to claim 1, wherein there is an angle $\psi$ between the incident slope and the bottom surface, a sum of the angle $\psi$ and an incident angle $\alpha$ of the incident light onto the incident slope is 90° ($\psi+\alpha=90°$), $\psi$ is greater than zero and less than or equal to 56.25° ($0<\psi\leq56.25°$), and an incident angle $\theta$ of the incident light onto the bottom surface is equal to $\arcsin(n_{layer}/n_{air}\times\sin\alpha)$ ($\theta=\arcsin(n_{layer}/n_{air}\times\sin\alpha)$), where $n_{Layer}$ denotes the refractive index of the material for the first light-transparent layer, $n_{air}$ denotes a refractive index of air, and a refractive index of a material for the Dove prism is within a range from 1.8 to 1.9, inclusive.

5. The light splitting device according to claim 4, wherein the dispersion grating includes a concave grating, and a Rowland circle of the concave grating has a plurality of light focusing points; and the concave grating is configured to diffract the received incident light into a plurality of spectral lines and to make each of the plurality of spectral lines be focused on a corresponding light focusing point;

both the input waveguide and the array of output waveguides are disposed at a concave surface of the concave grating; and the array of output waveguides includes a plurality of guiding waveguides in one-to-one correspondence to the plurality of spectral lines, and the plurality of guiding waveguides are further in one-to-one correspondence to the plurality of light focusing points.

6. The light splitting device according to claim 5, wherein the concave grating is at least partially disposed inside the Dove prism.

7. A method for dispersing light, used in the light splitting device according to claim 1, comprising:

by the optical waveguide body, receiving incident light and transmitting the incident light to the dispersion grating, wherein the incident light passes through the first light-transparent layer to the incident slope of the Dove prism, and is then reflected by the incident slope to the dispersion grating;

dispersing, by the dispersion grating, the received incident light into a plurality of spectral lines; and transmitting, by the dispersion grating, the plurality of spectral lines to the array of output waveguides; and by the optical waveguide body, changing the propagation directions of the plurality of spectral lines and emitting the plurality of spectral lines, wherein the array of output waveguides guides the plurality of spectral lines to the exit slope of the Dove prism, and the plurality of spectral lines are reflected by the exit slope of the Dove prism, so that the plurality of spectral lines are changed their propagation directions and then derived from the first light-transparent layer.

8. A spectrometer, comprising the light splitting device according to claim 1.

9. The spectrometer according to claim 8, wherein the spectrometer further comprises:

a collimated light source disposed at a side of the first light-transparent layer facing away from the second light-transparent layer and configured to supply incident light to the optical waveguide body;

a micro-fluidic substrate disposed at a side of the first light-transparent layer facing away from the second light-transparent layer and corresponding to exit positions for the plurality of spectral lines; and a sensing substrate disposed at a side of the micro-fluidic substrate facing away from the first light-transparent layer and configured to detect the plurality of spectral lines passing through the micro-fluidic substrate.

10. The spectrometer according to claim 9, wherein the micro-fluidic substrate includes: a first base substrate, and a reaction tank, a waste reservoir and a plurality of micro-fluidic channels all disposed on a side of the first base substrate facing the first light-transparent layer, and a contact adjustment layer disposed on an inner wall of each of the plurality of micro-fluidic channels; wherein the plurality of micro-fluidic channels are communicated with the reaction tank and the waste reservoir, respectively; and the plurality of micro-fluidic channels are in one-to-one correspondence with the plurality of spectral lines; and the sensing substrate includes: a second base substrate, and a plurality of photosensitive detectors disposed on a side of the second base substrate facing the first base substrate; wherein an orthographic projection of each of the plurality of photosensitive detectors on the second base substrate is within an orthographic projection of one of the plurality of micro-fluidic channels on the second base substrate.

11. The spectrometer according to claim 10, wherein the contact adjustment layer is a hydrophilic film or a hydrophobic film.

12. The light splitting device according to claim 1, wherein the input waveguide is a second bent waveguide.

13. A method for manufacturing a light splitting device, comprising:
    forming a first light-transparent layer;
    forming an optical waveguide body;
    forming a dispersion grating, wherein the optical waveguide body is configured to transmit incident light to the dispersion grating, the dispersion grating is configured to disperse the incident light transmitted by the optical waveguide body into a plurality of spectral lines, and the optical waveguide body is further configured to change propagation directions of the plurality of spectral lines and to emit the plurality of spectral lines; and a refractive index of a material for the first light-transparent layer is less than both a refractive index of a material for the optical waveguide body and a refractive index of a material for the dispersion grating; and
    forming a second light-transparent layer, wherein the second light-transparent layer is opposite to the first light-transparent layer; both the optical waveguide body and the dispersion grating are disposed between the first light-transparent layer and the second light-transparent layer; and a refractive index of a material for the second light-transparent layer is less than both the refractive index of the material for the optical waveguide body and the refractive index of the material for the dispersion grating, wherein
    the optical waveguide body includes a Dove prism, and the dispersion grating includes an arrayed waveguide; and forming the optical waveguide body and forming the dispersion grating, includes:
    forming a waveguide layer on a surface of the first light-transparent layer, wherein a refractive index of a material for the waveguide layer is greater than the refractive index of the material for the first light-transparent layer; and
    forming, by using the waveguide layer, a Dove prism, and an input waveguide, an arrayed waveguide and an array of output waveguides all directly disposed in a top surface of the Dove prism; wherein the Dove prism includes an incident slope and an exit slope, the incident slope is configured to reflect the incident light irradiated into the Dove prism and to supply the reflected incident light to the input waveguide, the input waveguide is configured to supply received incident light to the arrayed waveguide, the array of output waveguides is configured to guide the plurality of spectral lines and to supply the plurality of spectral lines to the exit slope, and the exit slope is configured to reflect the plurality of spectral lines and to derive the plurality of spectral lines from the Dove prism.

14. The method according to claim 13, wherein forming, by using the waveguide layer, a Dove prism, and an input waveguide, an arrayed waveguide and an array of output waveguides all disposed in a top surface of the Dove prism, includes:
    providing an optical mask above the waveguide layer, wherein the optical mask includes a plurality of patterns that are in one-to-one correspondence to the Dove prism to be formed, the input waveguide to be formed, the arrayed waveguide to be formed and the array of output waveguides to be formed;
    processing, by using the optical mask, the waveguide layer to obtain the Dove prism, and the input waveguide, the arrayed waveguide and the array of output waveguides all disposed in the top surface of the Dove prism; wherein there is an angle $\psi$ between the incident slope and a bottom surface of the Dove prism, a sum of the angle $\psi$ and an incident angle $\alpha$ of the incident light onto the incident slope of the Dove prism is 90° ($\psi+\alpha=90°$), and an incident angle $\theta$ of the incident light onto the bottom surface of the Dove prism is equal to $\arcsin(n_{layer}/n_{air} \times \sin \alpha)$ ($\theta = \arcsin(n_{layer}/n_{air} \times \sin \alpha)$), where $n_{Layer}$ denotes the refractive index of the material for the first light-transparent layer, and $n_{air}$ denotes a refractive index of air; and
    removing the optical mask.

15. The method according to claim 14, wherein providing an optical mask above the waveguide layer, includes:
    forming a metal film on a surface of the waveguide layer facing away from the first light-transparent layer;
    forming a photoresist layer on a surface of the metal film facing away from the waveguide layer;
    processing the photoresist layer by imprinting to obtain a photoresist mask, wherein the photoresist mask includes a plurality of patterns that are in one-to-one correspondence to the Dove prism to be formed, the input waveguide to be formed, the arrayed waveguide to be formed and the array of output waveguides to be formed; and
    processing, by using the photoresist mask, the metal film to obtain a metal mask, wherein the metal mask includes a plurality of patterns that are in one-to-one correspondence to the Dove prism to be formed, the input waveguide to be formed, the arrayed waveguide to be formed and the array of output waveguides to be formed, and the metal mask and the photoresist mask form the optical mask; and
    removing the optical mask, includes:
    removing the photoresist mask; and
    removing the metal mask.

16. A light splitting device, comprising: an optical waveguide body, a dispersion grating, and a first light-transparent layer and a second light-transparent layer that are opposite to each other, wherein
    the optical waveguide body and the dispersion grating are disposed between the first light-transparent layer and the second light-transparent layer; the optical waveguide body is configured to transmit incident light to the dispersion grating, the dispersion grating is configured to disperse the incident light transmitted by the optical waveguide body into a plurality of spectral lines, and the optical waveguide body is further configured to change propagation directions of the plurality of spectral lines and to emit the plurality of spectral lines; and
    a refractive index of a material for the optical waveguide body and a refractive index of a material for the dispersion grating are both greater than a refractive index of a material for the first light-transparent layer and are both greater than a refractive index of a material for the second light-transparent layer, wherein
    the optical waveguide body includes: an input waveguide, an array of output waveguides, a reflecting structure and a plurality of diffraction gratings; and the dispersion grating includes a concave grating;

both the input waveguide and the array of output waveguides are disposed at a concave surface of the concave grating;

the array of output waveguides includes a plurality of guiding waveguides; the plurality of guiding waveguides are in one-to-one correspondence to a plurality of light focusing points on a Rowland circle of the concave grating;

the reflecting structure is configured to reflect received incident light and to supply the reflected incident light to the input waveguide;

the input waveguide is configured to supply the received incident light to the concave grating;

the concave grating is configured to diffract the received incident light into a plurality of spectral lines and to make each of the plurality of spectral lines be focused on a corresponding light focusing point;

each of the plurality of guiding waveguides is configured to transmit a corresponding spectral line to a corresponding diffraction grating; and each of the plurality of diffraction gratings is configured to control a corresponding spectral line to emit from the first light-transparent layer.

17. A method for dispersing light, used in the light splitting device according to claim 16, comprising:

by the optical waveguide body, receiving incident light and transmitting the incident light to the dispersion grating, wherein the incident light passes through the first light-transparent layer to a reflecting surface of the reflecting structure, and is then reflected by the reflecting surface to the input waveguide, and the incident light is transmitted to the concave surface of the concave grating by the input waveguide;

dispersing, by the dispersion grating, the received incident light into a plurality of spectral lines, wherein the incident light is diffracted by the concave surface of the concave grating to obtain the plurality of spectral lines, the plurality of spectral lines are focused on the plurality of light focusing points on the Rowland circle of the concave grating in one-to-one correspondence, and a corresponding spectral line is guided to a corresponding diffraction grating by a guiding waveguide disposed at each light focusing point; and by the optical waveguide body, changing the propagation directions of the plurality of spectral lines and emitting the plurality of spectral lines, wherein each diffraction grating controls the corresponding spectral line to emit from the first light-transparent layer.

18. A spectrometer, comprising the light splitting device according to claim 16.

* * * * *